(12) United States Patent
Takahashi

(10) Patent No.: US 11,776,110 B2
(45) Date of Patent: *Oct. 3, 2023

(54) IMAGE MEASURING APPARATUS

(71) Applicant: Keyence Corporation, Osaka (JP)

(72) Inventor: Koji Takahashi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 348 days.

This patent is subject to a terminal disclaimer.

(21) Appl. No.: 16/783,185

(22) Filed: Feb. 6, 2020

(65) Prior Publication Data

US 2020/0302585 A1    Sep. 24, 2020

(30) Foreign Application Priority Data

Mar. 18, 2019  (JP) ................................ 2019-049698

(51) Int. Cl.
| | | |
|---|---|---|
| *G06T 1/60* | (2006.01) | |
| *G06T 1/20* | (2006.01) | |
| *G06T 7/00* | (2017.01) | |

(52) U.S. Cl.
CPC ............ *G06T 7/001* (2013.01); *G06T 1/20* (2013.01); *G06T 1/60* (2013.01); *G06T 2207/30164* (2013.01)

(58) Field of Classification Search
CPC .. G06T 7/001; G06T 1/20; G06T 1/60; G06T 2207/30164; G06T 7/60; G06T 7/0004; G06T 7/10; G06T 7/12; G06T 7/181; G06T 7/292; G06T 7/586
See application file for complete search history.

(56) References Cited

U.S. PATENT DOCUMENTS

| | | |
|---|---|---|
| 8,233,665 B2 | 7/2012 | Nakatsukasa |
| 8,503,757 B2 | 8/2013 | Naruse et al. |
| 9,341,465 B2 * | 5/2016 | Kawa ..................... G01B 11/00 |

(Continued)

FOREIGN PATENT DOCUMENTS

| | | | | |
|---|---|---|---|---|
| JP | 5679560 B2 | 3/2015 | | |
| JP | 2017032340 A * | 7/2015 | ............. | G01B 11/25 |

(Continued)

OTHER PUBLICATIONS

U.S. Appl. No. 16/783,186, filed Feb. 6, 2020 (111 pages).

*Primary Examiner* — Sumati Lefkowitz
*Assistant Examiner* — Michael Adam Shariff
(74) *Attorney, Agent, or Firm* — Kilyk & Bowersox, P.L.L.C.

(57) ABSTRACT

In a setting mode, a processor stores in a memory a reference image for pattern search, measurement location information indicating a plurality of measurement locations, and imaging setting information indicating at which magnification imaging is performed. In a measurement mode, the processor controls an imaging section, acquires a target image for pattern search, executes a pattern search on the target image using the reference image, specifies a plurality of imaging positions for imaging each of the plurality of measurement locations based on the measurement location information and a result of the pattern search, causes the imaging section to perform imaging at a magnification set for each measurement location, and measures a dimension of the measurement location.

19 Claims, 24 Drawing Sheets

(56) References Cited

U.S. PATENT DOCUMENTS

| | | | |
|---|---|---|---|
| 10,088,301 B2 | 10/2018 | Naruse et al. | |
| 10,088,302 B2 | 10/2018 | Takahashi et al. | |
| 2006/0151700 A1* | 7/2006 | Honda | H01J 37/21 250/310 |
| 2017/0069110 A1* | 3/2017 | Nakajima | G06T 7/60 |
| 2020/0074618 A1 | 3/2020 | Takahashi | |
| 2020/0074663 A1 | 3/2020 | Hashimoto et al. | |
| 2020/0233379 A1* | 7/2020 | Aoi | G03H 1/0005 |

FOREIGN PATENT DOCUMENTS

| | | | | |
|---|---|---|---|---|
| JP | 2017032340 A | * | 2/2017 | |
| JP | 2018081115 A | | 5/2018 | |
| JP | 6338730 B2 | * | 6/2018 | G02B 21/365 |

\* cited by examiner

FIG. 23A
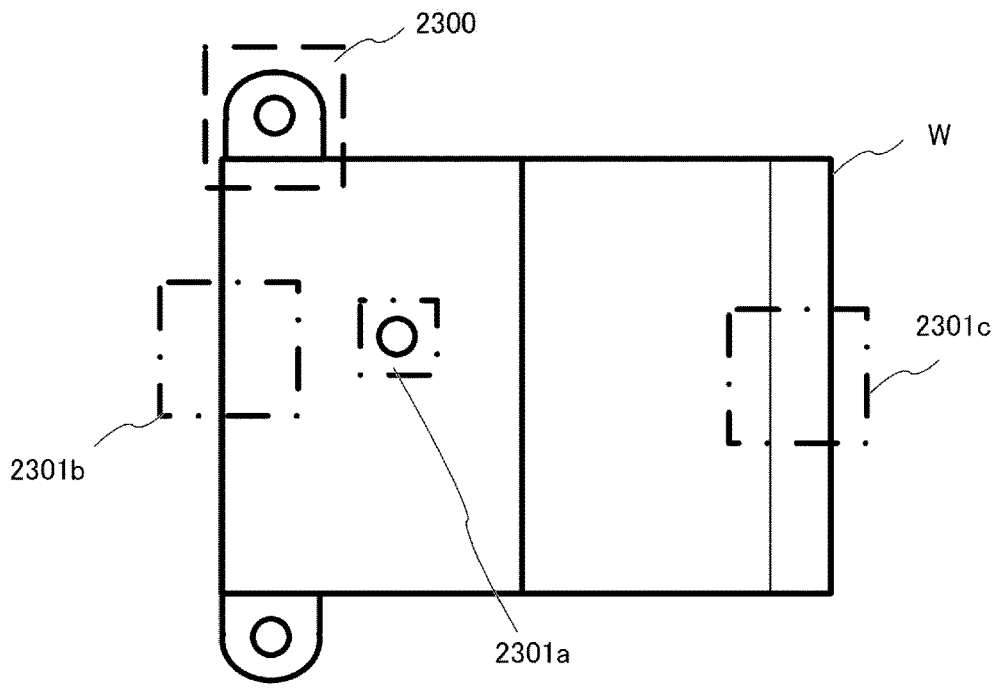
FIG. 23B
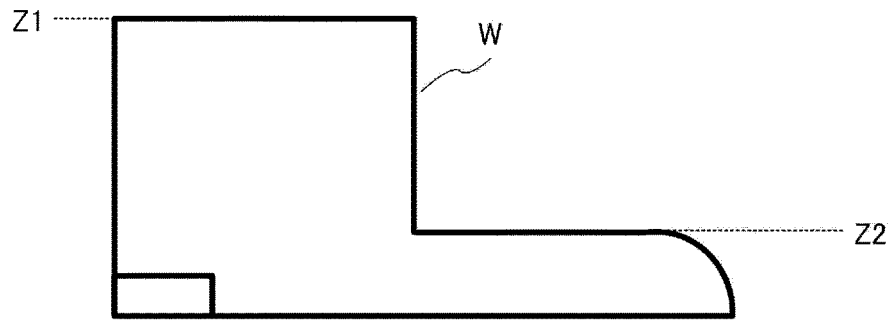
FIG. 23C
| MEASUREMENT LOCATION | MAGNIFICATION | ILLUMINATION CONDITION | FOCAL POSITION |
|---|---|---|---|
| 2301a | HIGH | EPI-ILLUMINATION | Z1 |
| 2301b | LOW | TRANSMISSION | Z1 |
| 2301c | LOW | RING | Z2 |

IMAGE MEASURING APPARATUS

CROSS-REFERENCE TO RELATED APPLICATIONS

The present application claims foreign priority based on Japanese Patent Application No. 2019-049698, filed Mar. 18, 2019, the contents of which are incorporated herein by reference.

BACKGROUND OF THE INVENTION

1. Field of the Invention

The present invention relates to an image measuring apparatus.

2. Description of Related Art

An image measuring apparatus images a workpiece (inspection object) to generate a workpiece image, and measures a dimension and the like of the workpiece based on the workpiece image.

According to Japanese Patent No. 5,679,560, an image measuring apparatus (image dimension measuring apparatus) equipped with a high-magnification camera in addition to a low-magnification camera is proposed.

SUMMARY OF THE INVENTION

A high-magnification camera can magnify and image a part of a workpiece, and thus the high-magnification camera can measure a dimension of a more precise part. However, the high-magnification camera has an imaging visual field narrower than that of a low-magnification camera. Therefore, the number of times of imaging for imaging the entire workpiece with the high-magnification camera is several times the number of times of imaging for imaging the entire workpiece with the low-magnification camera. Further, in order to measure dimensions of a plurality of features existing on the workpiece, a plurality of measurement locations are set in advance. However, a high-magnification image is not required at all of the measurement locations. That is, there are cases where the dimensions can be measured sufficiently even with a low-magnification image. In such cases, the number of times of imaging is reduced by imaging a measurement location with a low-magnification camera.

Therefore, an object of the invention is to make it possible to efficiently perform image measurement by reducing the number of times of imaging.

The invention provides, for example, an image measuring apparatus including: a table on which a workpiece is placed; an imaging section including a low-magnification optical system that images the workpiece at a low magnification to generate a low-magnification image, and a high-magnification optical system that has an optical axis which is coaxial with an optical axis of the low-magnification optical system and that images the workpiece at a magnification higher than the low magnification to generate a high-magnification image; a driving section that changes an imaging position of the imaging section by driving at least one of the table and the imaging section such that the table and the imaging section relatively move in an XY direction; a processor that controls the driving section and the imaging section, generates a plurality of low-magnification images or high-magnification images for different portions of the workpiece, and generates a connected image by connecting the generated plurality of low-magnification images or high-magnification images; and a memory that stores the connected image, wherein, in a setting mode, the processor stores in the memory a reference image for pattern search generated by imaging by the imaging section at least a part of the connected image or a position designated by a user in the connected image, measurement location information indicating a plurality of measurement locations designated by the user in the connected image, and imaging setting information indicating at which magnification of the low magnification and the high magnification each imaging position is imaged, and, in a measurement mode, the processor controls the imaging section and acquires a target image for pattern search, executes a pattern search on the target image for pattern search using the reference image for pattern search stored in the memory, specifies a plurality of imaging positions for imaging each of the plurality of measurement locations based on measurement location information associated with each of the plurality of measurement locations stored in the memory and a result of the pattern search, generates the low-magnification images or the high-magnification images by causing the driving section to drive at least one of the table and the imaging section to sequentially set an imaging position of the imaging section to each of the plurality of imaging positions and by causing the imaging section to perform imaging at a magnification according to the imaging setting information at each of the plurality of imaging positions, and measures, for a measurement location corresponding to each imaging position, a dimension of the measurement location based on the low-magnification image or the high-magnification image acquired for each of the plurality of imaging positions.

According to the invention, the number of times of imaging is reduced, and thus it is possible to efficiently perform image measurement.

BRIEF DESCRIPTION OF THE DRAWINGS

FIGS. 23A, 23B, and 23C are diagrams illustrating a setting operation; and

DESCRIPTION OF EMBODIMENTS

Figure 1:
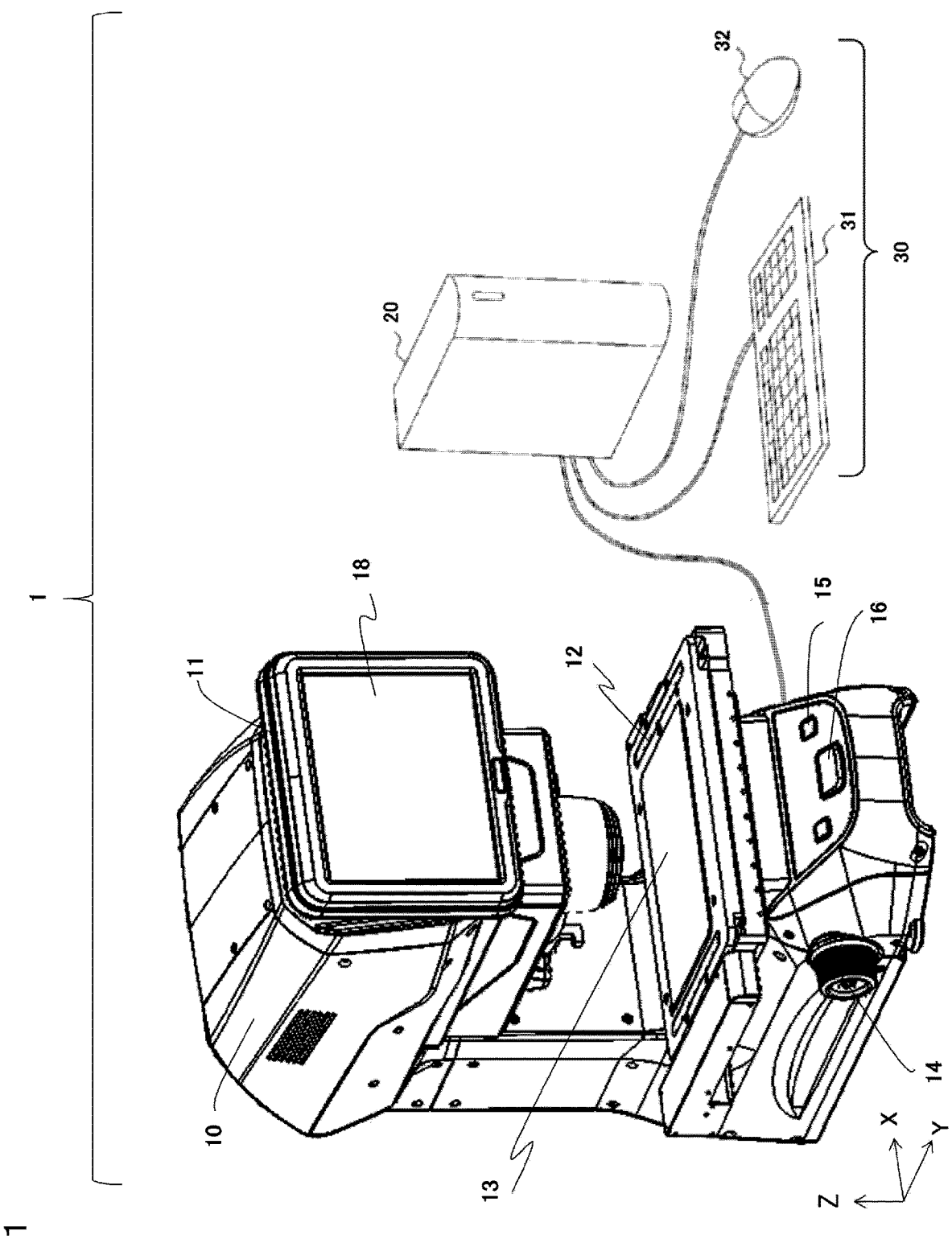
FIG. 1 is a perspective view of an image measuring apparatus.

Embodiments will be described in detail below with reference to the attached drawings. The following embodiments are not intended to limit the invention according to the claims, and all combinations of features described in the embodiments are not necessarily essential to the invention. Two or more features of a plurality of features described in the embodiments may be arbitrarily combined. In addition, same or similar components are given the same reference numeral, and redundant description is omitted.

<Image Measuring Apparatus 1>

FIG. 1 is a perspective view showing a configuration example of an image measuring apparatus 1. The image measuring apparatus 1 is an image measuring apparatus that images a workpiece to generate a workpiece image, and measures a dimension of the workpiece in the workpiece image. In FIG. 1, the image measuring apparatus 1 includes a measuring unit 10, a control unit 20, a keyboard 31, and a pointing device 32. The workpiece is a measuring object whose shape and dimension are to be measured by the image measuring apparatus 1.

The measuring unit 10 includes a display device 11, a movable stage 12, an XY adjustment knob (not shown), a Z adjustment knob 14, a power switch 15, and an execution button 16. The measuring unit 10 irradiates the workpiece placed on the movable stage 12 with illumination light, and receives transmitted light of the workpiece or reflected light from the workpiece to generate a workpiece image. The workpiece is placed on a light transmitting plate 13 of the movable stage 12. The measuring unit 10 displays the workpiece image on a display screen 18 of the display device 11.

The display device 11 is a display device that displays a workpiece image, a measurement result, and a setting UI (user interface) on the display screen 18. A user sets a feature location for pattern search, a measurement location for dimension measurement, and the like by operating the keyboard 31 and the pointing device 32 while looking at the workpiece image displayed on the display device 11. The movable stage 12 is a table for placing a workpiece. The light transmitting plate 13 is region formed with glass having light transmissivity. The movable stage 12 moves in a Z-axis direction parallel to an imaging axis of a camera, and an X-axis direction and a Y-axis direction perpendicular to the imaging axis.

The XY adjustment knob adjusts a relative position (position in the X-axis direction and position in the Y-axis direction) of the movable stage 12 with respect to the camera by moving the movable stage 12 in the X-axis direction or the Y-axis direction. The Z adjustment knob 14 adjusts a relative position (position in the Z-axis direction) of the movable stage 12 with respect to the camera by moving the movable stage 12 in the Z-axis direction. The power switch 15 is an operating section for switching main power supply of the measuring unit 10 and the control unit 20 between an on state and an off state. The execution button 16 is an operating section for starting dimension measurement.

The control unit 20 is a controller that controls imaging and screen display by the measuring unit 10, and analyzes the workpiece image to measure the dimension of the workpiece. The control unit 20 is connected to the keyboard 31 and the pointing device 32, and accepts a user input through the keyboard 31 and the pointing device 32. The keyboard 31 and the pointing device 32 are included in an operating section 30. The control unit 20 activates the measuring unit 10 when the power switch 15 is switched on. When the execution button 16 is operated, the control unit 20 controls the measuring unit 10 according to setting data prepared in advance to search for a workpiece in the light transmitting plate 13 and measure the dimension of the workpiece.

<Measuring Unit 10>

Figure 2:
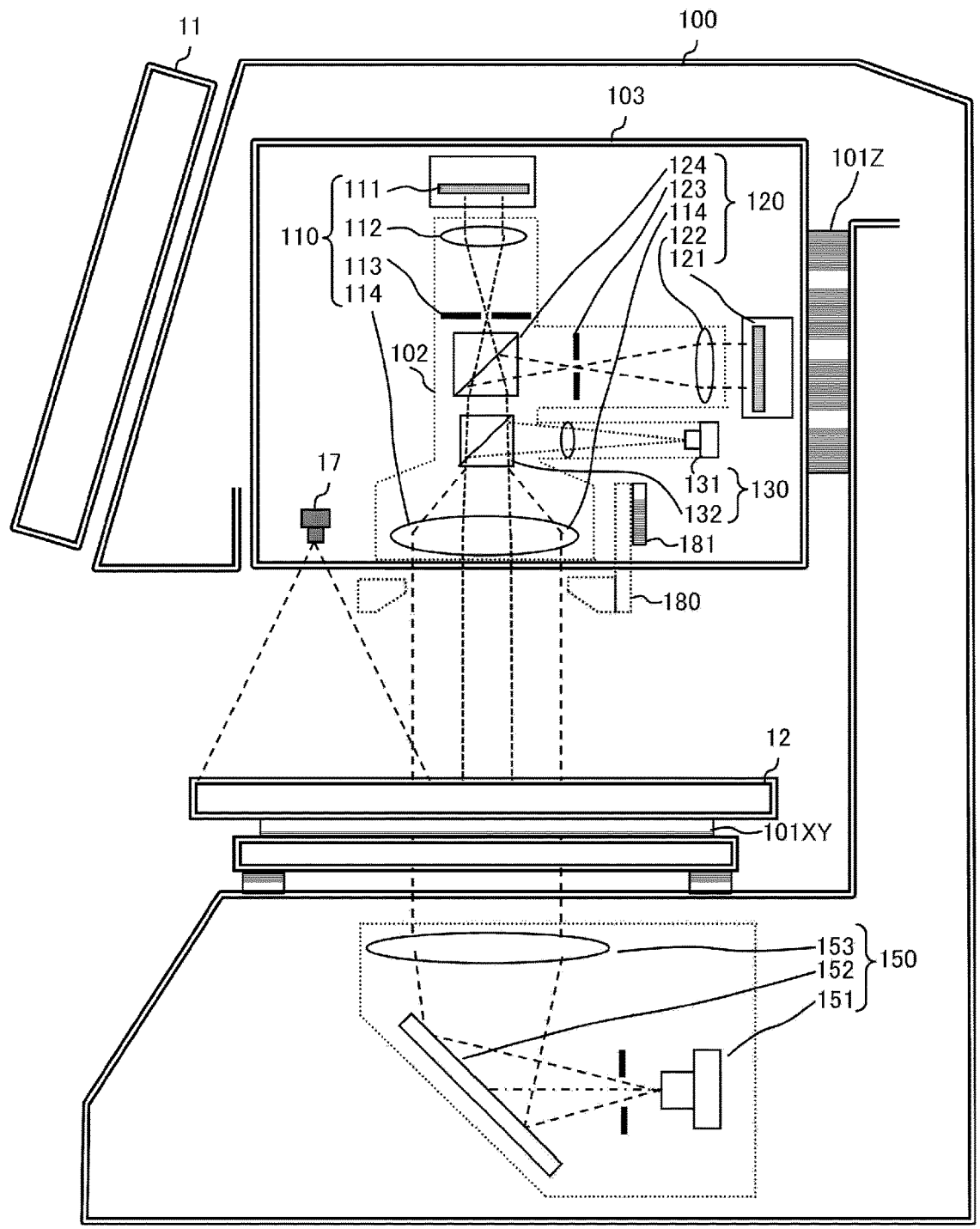
FIG. 2 is a cross-sectional view of a measuring unit.

FIG. 2 is a cross-sectional view schematically showing a configuration example of the measuring unit 10. Here, a cut section where the measuring unit 10 is cut by a vertical plane (YZ plane) parallel to the imaging axis is shown. The measuring unit 10 includes the display device 11, the movable stage 12, a housing 100, a stage driving section 101XY, 101Z, a lens barrel section 102, a low-magnification camera 110, a high-magnification camera 120, a coaxial epi-illumination 130, and a transmission illumination 150. The low-magnification camera 110 and the high-magnification camera 120 are used for dimension measurement, and thus they may be referred to as cameras for measurement.

The lens barrel section 102, the low-magnification camera 110, the high-magnification camera 120, the coaxial epi-illumination 130, and the transmission illumination 150 are arranged inside the housing 100. A stage driving section 101Z moves a camera head 103 in the Z-axis direction with respect to the movable stage 12, and adjusts a distance between the low-magnification camera 110, the high-magnification camera 120 and the movable stage 12. The stage driving section 101Z may move the movable stage 12 in the Z-axis direction. The stage driving section 101Z may move the camera head 103 in order to focus the low-magnification camera 110 and the high-magnification camera 120 on the workpiece, etc. A stage driving section 101XY moves the movable stage 12 in the X-axis direction and the Y-axis direction.

The low-magnification camera 110 is an imaging device having a low imaging magnification as compared with the high-magnification camera 120. The low-magnification camera 110 includes an imaging element 111, an imaging lens 112, a diaphragm plate 113, and a light receiving lens 114. The imaging lens 112, the diaphragm plate 113, and the light receiving lens 114 are included in a low-magnification optical system. The imaging element 111 receives illumination to generate a workpiece image. The imaging element 111 is arranged with its light receiving surface facing downward. The imaging lens 112 is an optical member that forms an image with the illumination light on the imaging element 111. The diaphragm plate 113 is an optical diaphragm that restricts transmitted light amount of the illumination light and a depth of field, and is arranged between the imaging lens 112 and the light receiving lens 114. The light receiving lens 114 is an optical member that condenses the illumination light from the workpiece, and is arranged to face the movable stage 12. The imaging lens 112, the diaphragm plate 113, and the light receiving lens 114 are arranged centering a central axis extending in a vertical direction.

The high-magnification camera 120 is an imaging device having a high imaging magnification as compared with the low-magnification camera 110. The high-magnification camera 120 includes an imaging element 121, an imaging lens 122, a diaphragm plate 123, a half mirror 124, and a light receiving lens 114. The imaging lens 122, the diaphragm plate 123, the half mirror 124, and the light receiving lens 114 are included in a high-magnification optical system. The imaging element 121 receives illumination light to generate a workpiece image. The imaging element 121 is arranged with its light receiving surface facing in a horizontal direction. That is, the light receiving surface and the horizontal direction are orthogonal to each other. The imaging lens 122 is an optical member that forms an image with the illumination light on the imaging element 121. The diaphragm plate 123 is an optical diaphragm that restricts transmitted light amount of the illumination light, and is arranged between the imaging lens 122 and the half mirror 124. The light receiving lens 114 is shared by the low-magnification camera 110 and the high-magnification camera 120. The illumination light transmitted through the light receiving lens 114 is bent in the horizontal direction by the half mirror 124 and forms an image on the imaging element 121 via the diaphragm plate 123 and the imaging lens 122.

Image sensors such as CCD (Charge Coupled Devices) and CMOS (Complementary Metal Oxide Semiconductor) are used as the imaging elements 111 and 121. As the light receiving lens 114, a telecentric lens having a property that does not change the size of the image of the workpiece even if the distance between the light receiving lens 114 and the workpiece changes is used. That is, the low-magnification optical system and the high-magnification optical system have telecentricity respectively. A distortion of a workpiece in a workpiece image acquired by a telecentric optical system is very small as compared with a distortion of a workpiece in a workpiece image acquired by a non-telecentric optical system. Therefore, the workpiece is measured with high accuracy. Note that the low-magnification optical system and the high-magnification optical system may not have telecentricity.

The coaxial epi-illumination 130 is an illumination device that irradiates the workpiece on the movable stage 12 with illumination light from above. Instead of the coaxial epi-illumination 130, epi-illumination such as ring illumination may be used. An optical axis of irradiation light of the coaxial epi-illumination 130 coincides with the imaging axis. The coaxial epi-illumination 130 includes a light source 131 arranged so as to output illumination light in the horizontal direction, and a half mirror 132 which bends downward the illumination light emitted from the light source 131. The illumination light of the coaxial epi-illumination 130 is advantageous in acquiring irregularities and patterns on the workpiece surface.

Further, a ring illumination 180 is provided around the light receiving lens 114. A stage driving section 181 moves the ring illumination 180 up and down. In this way, an illumination angle of the illumination to the workpiece is adjusted, and it is possible to adjust a way to make an edge stand out.

The imaging lenses 112 and 122, the diaphragm plates 113 and 123, the half mirrors 124 and 132, and the light receiving lens 114 are arranged inside the lens barrel section 102.

The transmission illumination 150 is an illumination device that irradiates the workpiece on the movable stage 12 with illumination light from below. The transmission illumination 150 includes a light source 151, a mirror 152, and a light condensing lens 153. The light source 151 is arranged to output illumination light in the horizontal direction. The illumination light emitted from the light source 151 is reflected by the mirror 152 and is condensed by the light condensing lens 153. The illumination light is transmitted through the movable stage 12 and irradiated onto the workpiece. A part of the illumination light is blocked by the workpiece, and another part of the illumination light is incident on the light receiving lens 114. The illumination light of the transmission illumination 150 is advantageous in acquiring an edge of an outer shape of the workpiece.

An LED (light emitting diode) or a halogen lamp is used as each light source of the coaxial epi-illumination 130 and the transmission illumination 150.

A bird's eye view camera 17 is an imaging device used for acquiring a bird's eye view image of the movable stage 12. The bird's eye view image is an image including almost the entire movable stage 12. An imaging visual field of the bird's eye view camera 17 is wider than an imaging visual field of the low-magnification camera 110 and the high-magnification camera 120. Therefore, comparing with the low-magnification camera 110 and the high-magnification camera 120, the bird's eye view camera 17 is suitable for acquiring an image of a wider range. On the other hand, the telecentricity of the bird's eye view camera 17 is lower than the telecentricity of the low-magnification camera 110 and the high-magnification camera 120. Therefore, the bird's eye view camera 17 may be called a non-telecentric camera. The shape of the workpiece is distorted in the workpiece image acquired by the bird's eye view camera 17, and thus the bird's eye view camera 17 is not suitable for measuring the workpiece as compared with the low-magnification camera 110 and the high-magnification camera 120. The visual field of the optical system is circular, and a subject in the visual field forms an image circle and is imaged on the imaging element. On the other hand, a range that can be imaged by the imaging element is rectangular. That is, an imaging region is a part of rectangular region within the image circle. Here, a rectangular region on the movable stage 12 corresponding to the imaging region of the imaging element is called an imaging visual field.

<Bird's Eye View Camera>

As shown in FIG. 2, the light receiving lens 114 covers a considerable part of the movable stage 12. Therefore, the bird's eye view camera 17 is arranged at a position avoiding the light receiving lens 114. The bird's eye view camera 17 may be realized by a single camera, and may also be realized by a plurality of cameras.

Figure 3A:
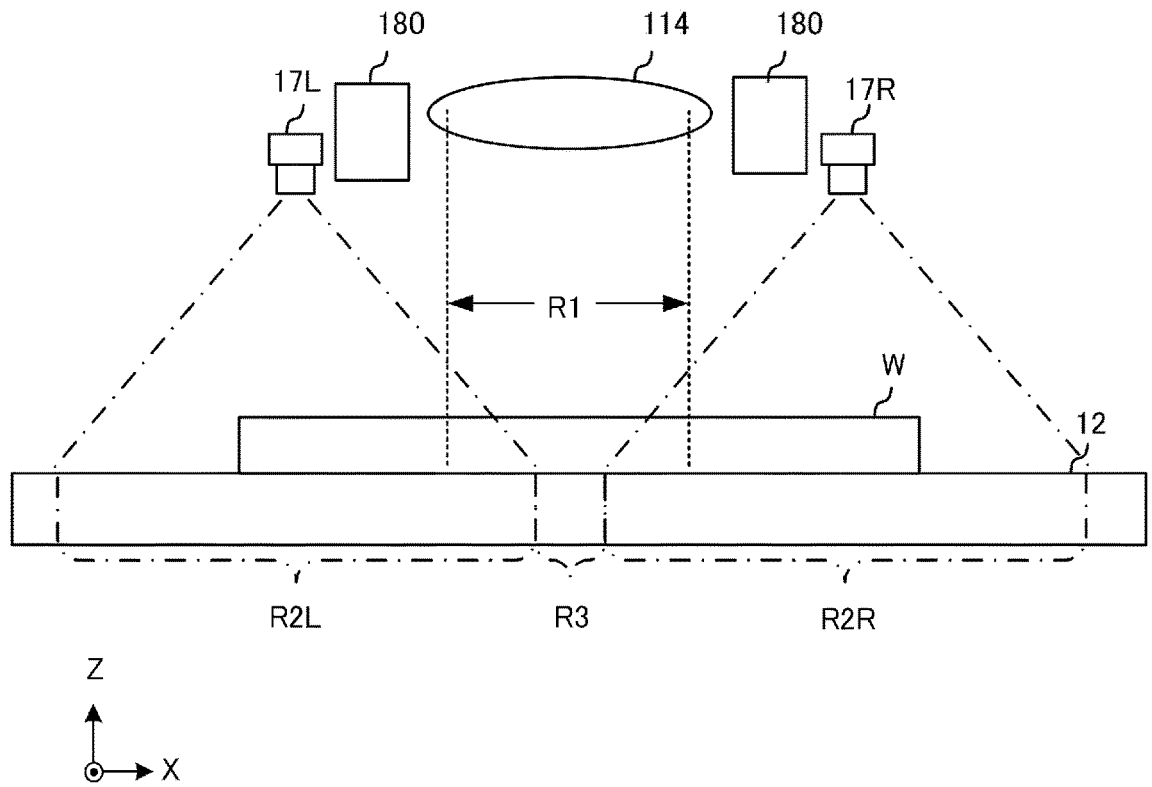
FIGS. 3A and 3B are diagrams illustrating an arrangement of a bird's eye view camera.

FIG. 3A is a diagram illustrating an arrangement of the bird's eye view camera 17 when the bird's eye view camera 17 is viewed from a front side of the measuring unit 10. W indicates a workpiece. In this example, a bird's eye view camera 17L is arranged on a left side of the light receiving lens 114, and a bird's eye view camera 17R is arranged on a right side of the light receiving lens 114. R1 indicates a visual field range of the low-magnification camera 110. R2L indicates a visual field range of the bird's eye view camera 17L. R2R indicates a visual field range of the bird's eye view camera 17R. By adopting the two bird's eye view cameras 17R and 17L, it is possible to image most part of the movable stage 12 at once. Nevertheless, a blind spot range R3 that cannot be covered by the visual field range R2L of the bird's eye view camera 17L and the visual field range R2R of the bird's eye view camera 17R occurs on the movable stage 12.

Figure 3B:
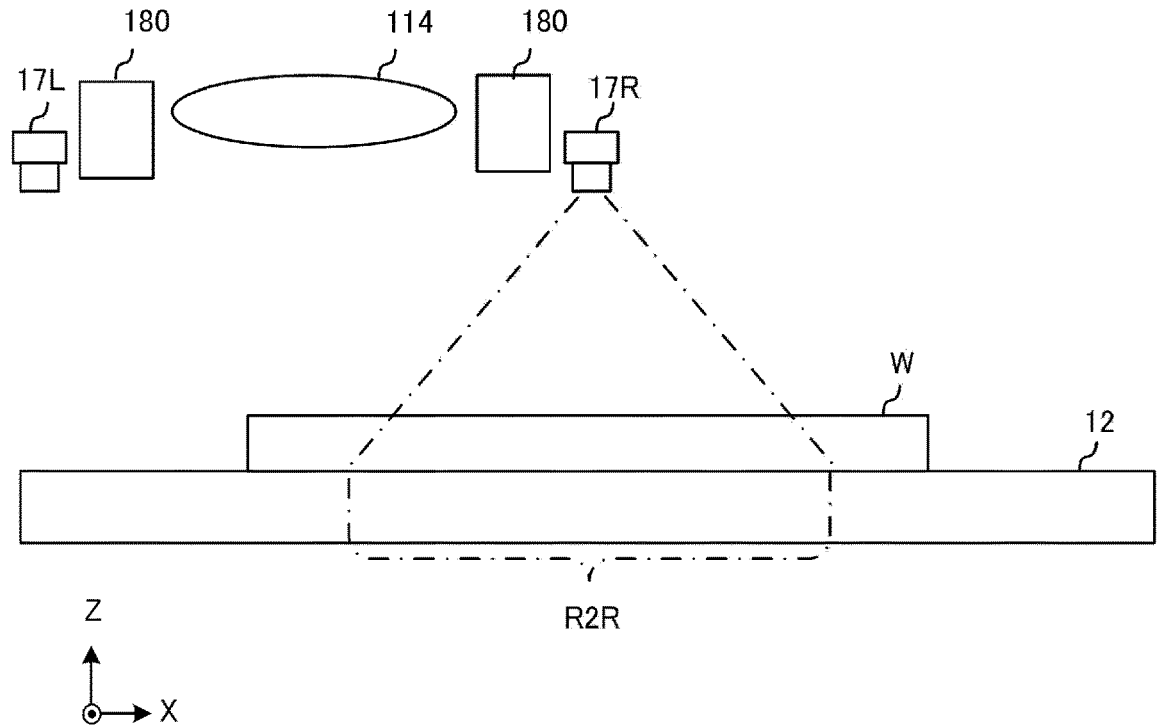

FIG. 3B is a diagram illustrating a method of imaging a workpiece W arranged near the center of the movable stage 12 by the bird's eye view camera 17. A bird's eye view image of the workpiece W arranged near the center of the movable stage 12 is acquired by moving the movable stage 12 such that an optical axis of the bird's eye view camera 17R coincides with the center of the movable stage 12. Although the bird's eye view camera 17R is used here, the bird's eye view camera 17L may also be used.

A synthesized bird's eye view image that covers the entire movable stage 12 may be created by synthesizing a bird's eye view image acquired by the bird's eye view camera 17L, a bird's eye view image acquired by the bird's eye view camera 17R in FIG. 3A, and a bird's eye view image acquired by the bird's eye view camera 17R in FIG. 3B. Although a synthesized bird's eye view image cannot be created in real time, a synthesized bird's eye view image can be created when real-time performance is not necessary.

FIG. 3A illustrates an example in which the blind spot range R3 of the two bird's eye view cameras 17R and 17L occurs. However, depending on angles of field, installation positions, etc. of the two bird's eye view cameras 17R and 17L adopted, there may be a case where there is no blind spot range R3 and the entire movable stage 12 can be imaged at once.

<Controller>

Figure 4:
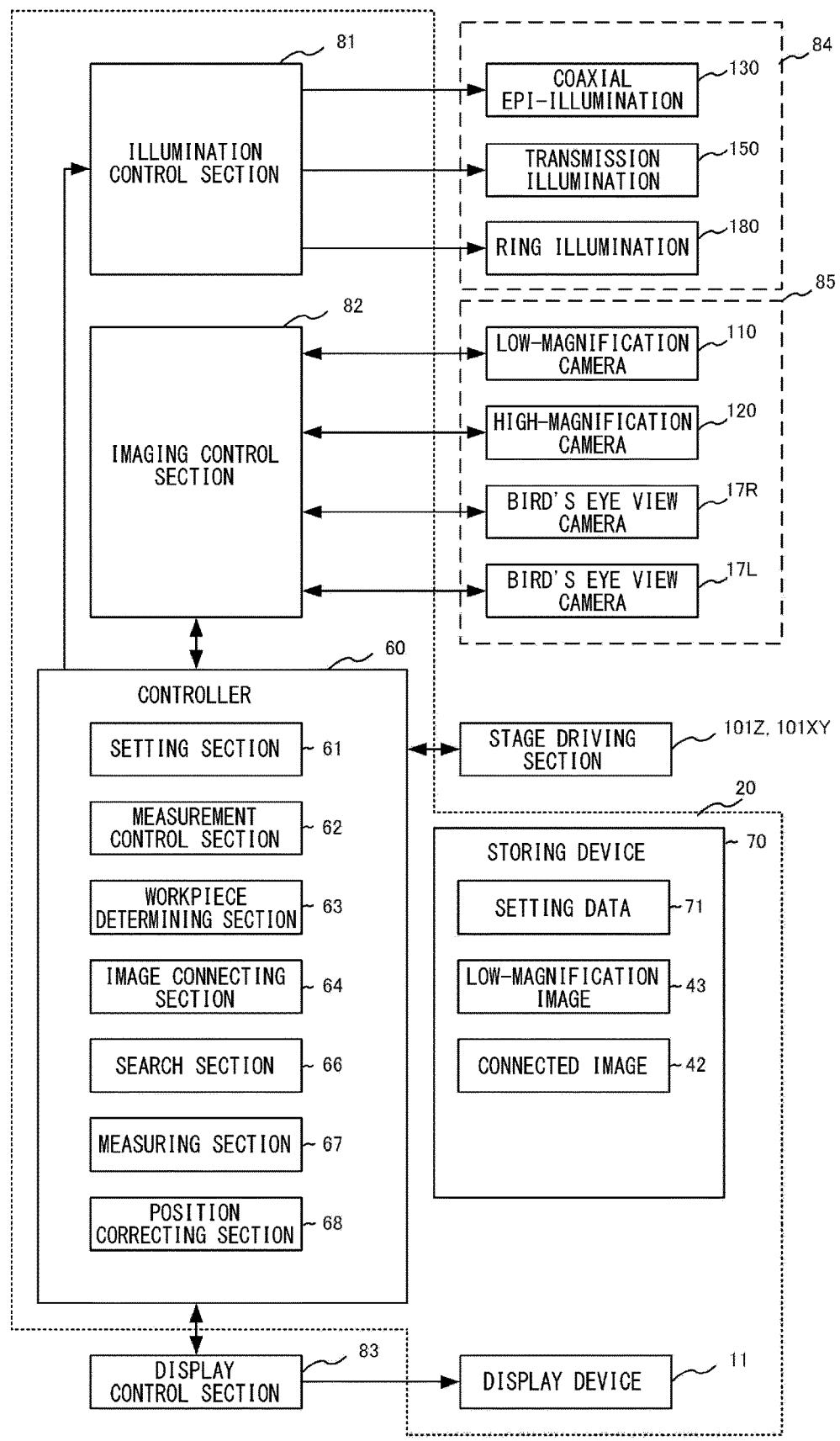
FIG. 4 is a diagram illustrating a controller.
Figure 5:
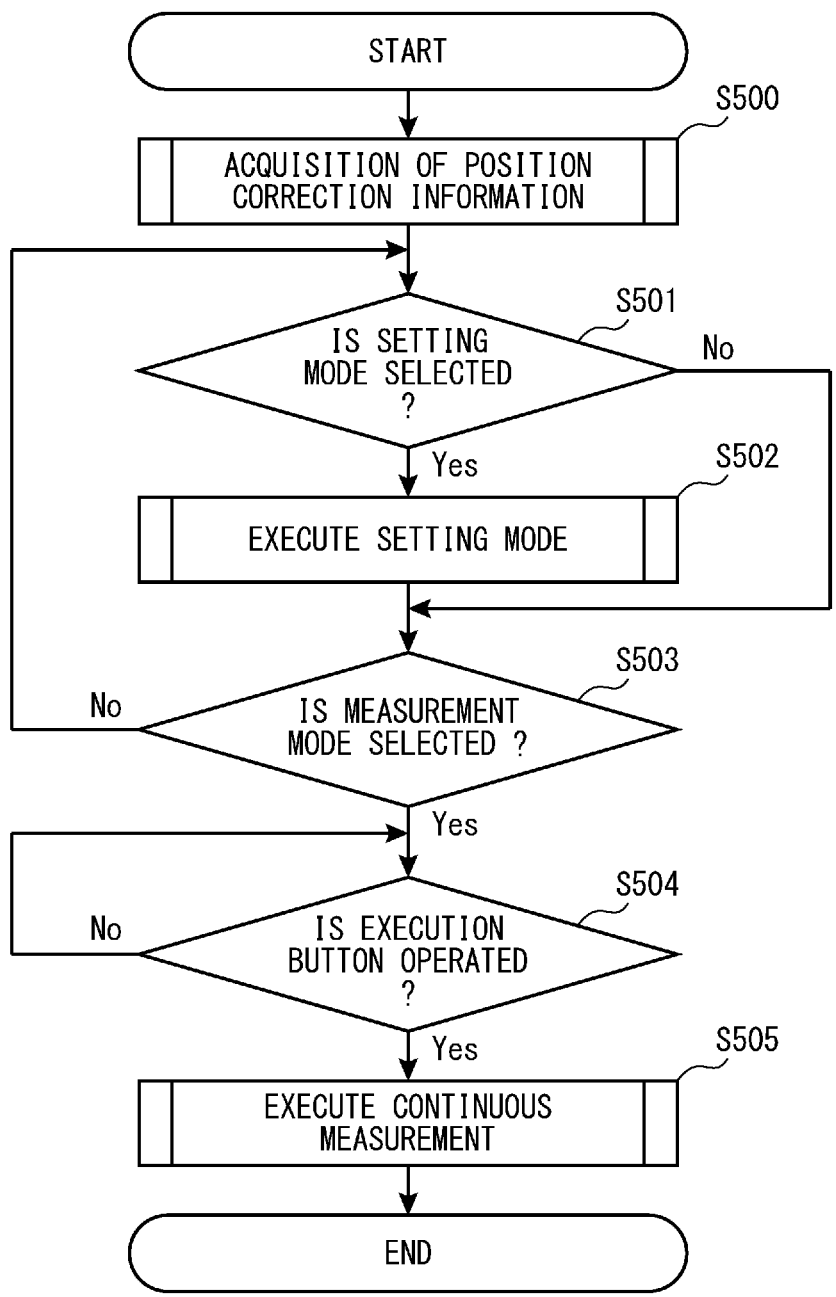
FIG. 5 is a flow chart showing main processing.

FIG. 4 is a diagram illustrating functions of a controller 60 mounted on the control unit 20. FIG. 5 shows an optional function required in generating a bird's eye view image. The controller 60 includes a processor (e.g., a CPU, etc.) and controls the measuring unit 10. CPU is an abbreviation for central processing unit. A part or all of the functions of the controller 60 may be realized by hardware such as ASIC and FPGA. ASIC is an abbreviation for application specific integrated circuit. FPGA is an abbreviation for field programmable gate array. An illumination control section 81 is mounted on the control unit 20 or the measuring unit 10 and controls an illumination unit 84 (the coaxial epi-illumination 130, the transmission illumination 150, and the ring illumination 180) according to a control signal from the controller 60. An imaging control section 82 is mounted on the control unit 20 or the measuring unit 10 and controls a camera unit 85 (the low-magnification camera 110, the high-magnification camera 120, and the bird's eye view cameras 17R and 17L) according to a control signal from the controller 60. A storing device 70 includes a memory, a hard disk drive, etc., and stores setting data 71, a low-magnification image 43, the bird's eye view image, etc.

A setting section 61 creates the setting data 71 for measuring the workpiece W according to a user input inputted from the keyboard 31, etc. The setting data 71 includes, for example, setting information relating to the pattern search (positioning) of the workpiece, setting information relating to the measurement location, a non-defective product threshold value, an imaging condition (imaging magnification, exposure condition, and illumination condition), etc.

The measurement control section 62 turns on one of the illumination units through the illumination control section 81 according to the setting data 71, and causes one of the camera units to perform imaging through the imaging control section 82.

A workpiece determining section 63 extracts, when generating a connected image, an edge from an image acquired by the low-magnification camera 110 or the high-magnification camera 120, and determines the presence or absence of an edge. The workpiece determining section 63 obtains an extending direction of the edge, and determines a coordinate of an imaging position where a next imaging is to be performed. An image connecting section 64 connects a plurality of low-magnification images 43 including the edge of the workpiece W and generates a connected image 42.

A search section 66 executes a pattern search on a target image acquired by the low-magnification camera 110 based on the setting data 71 and specifies a position and a posture of the workpiece W. For example, the search section 66 compares a reference image included in the setting data 71 with the target image, obtains a position deviation amount and a posture deviation amount of the target image with respect to the reference image, and generates a coordinate conversion formula of a measurement location from the position deviation amount and the posture deviation amount. By inputting the coordinate of each measurement location included in the setting data 71 to this conversion formula, the coordinate of each measurement location with respect to the measurement target, i.e., the workpiece W, is determined. In addition, the search section 66 converts the coordinate of each measurement location into a machine coordinate of an imaging position corresponding to each measurement location. The search section 66 obtains the shortest route (imaging order) for imaging and moving around all the machine coordinates of each of the imaging positions of a plurality of measurement locations. The measurement control section 62 sets the machine coordinates of each measurement location in the stage driving section 101XY according to the imaging order, and drives the movable stage 12. Further, the imaging control section 82 executes imaging by applying imaging conditions (imaging magnification and illumination conditions) based on the setting data 71 for each measurement location to the illumination unit and the camera unit. For example, when the imaging magnification is low, the imaging control section 82 causes the low-magnification camera 110 to perform imaging of the measurement location. When the imaging magnification is high, the imaging control section 82 causes the high-magnification camera 120 to perform imaging of the measurement location. In this way, a workpiece image for each measurement location is generated.

A measuring section 67 performs various measurements relating to the workpiece W from the workpiece image according to the setting data 71. The workpiece image may be the connected image 42 generated by connecting a plurality of low-magnification images or high-magnification images for each measurement location, and may also be a single low-magnification image or high-magnification image for each measurement location. The measuring section 67 has a plurality of measurement tools. The plurality of measurement tools may include a line-to-line distance measurement tool that measures a distance between a line and another line, a point-to-line distance measurement tool that measures a distance between a point and a line, a squareness measurement tool that measures squareness between a line and another line, etc. The measuring section 67 recognizes these points and lines as edges in the image and performs measurement based on the edges. For example, the measuring section 67 performs dimension measurement using one or a plurality of edges included in the workpiece image. The measuring section 67 may perform dimension measurement using a predetermined edge included in a first low-magnification image and a predetermined edge included in a second low-magnification image. The measuring section 67 may perform dimension measurement using a predetermined edge included in a first high-magnification image and a predetermined edge included in a second high-magnification image. The measuring section 67 may perform dimension measurement using a predetermined edge included in a low-magnification image and a predetermined edge included in a high-magnification image. The measuring section 67 may compare a measurement result with the non-defective product threshold value and determines (inspects) whether the workpiece W is a non-defective product. A position correcting section 68 corrects a relation between a position of a feature extracted from the low-magnification image and a position of a feature extracted from the high-magnification image based on the position correction information acquired in advance.

A display control section 83 displays a UI for creating the setting data 71 on the display device 11 according to an instruction of the controller 60, displays various images, and displays a measurement result (inspection result).

<Flow Chart>

FIG. 5 is a flow chart showing main processing executed by the controller 60 when the power switch 15 is switched on.

In S500, the controller 60 (position correcting section 68) acquires the position correction information. An attachment position of the low-magnification camera 110 and an attachment position of the high-magnification camera 120 respectively have individual differences per measuring unit 10. Moreover, these positions have temperature dependence characteristics, and thus they change depending on an environment in which the measuring unit 10 is installed. The position of a feature of the workpiece W extracted from the low-magnification image and the position of the feature of the workpiece W extracted from the high-magnification image should be the same. However, a deviation occurs between the two positions. The storing device 70 stores default position correction information for correcting the positional relations in an assembly process (at the time of factory shipment) of the measuring unit 10. When the power switch 15 is switched on and the controller 60 is activated, the controller 60 (position correcting section 68) executes acquisition processing to acquire position correction information, and updates the position correction information stored in the storing device 70. The position correcting section 68 corrects at least one of the coordinate relating to the low-magnification image and the coordinate relating to the high-magnification image based on the position correction information. In this way, the position of the feature of the workpiece W extracted from the low-magnification image becomes the same as the position of the feature of the workpiece W extracted from the high-magnification image.

In S501, the controller 60 determines whether a setting mode has been selected by the user through the operating section 30. When the setting mode is not selected, the controller 60 skips S502 and proceeds to S503. On the other hand, when the setting mode is selected, the controller 60 proceeds to S502.

In S502, the controller 60 (the setting section 61) executes the setting mode. Details of the setting mode will be described later with reference to FIG. 6.

In S503, the controller determines whether a measurement mode has been selected by the user through the operating section 30. When the measurement mode is not selected, the controller 60 returns to S501. On the other hand, when the measurement mode is selected, the controller 60 proceeds to S504.

In S504, the controller 60 determines whether the execution button 16 has been operated by the user. When the execution button 16 is operated by the user, the controller 60 proceeds to S505.

In S505, the controller 60 (the measurement control section 62) executes a continuous measurement mode. Details of the continuous measurement mode will be described later with reference to FIG. 7.

Setting Mode

Figure 6:
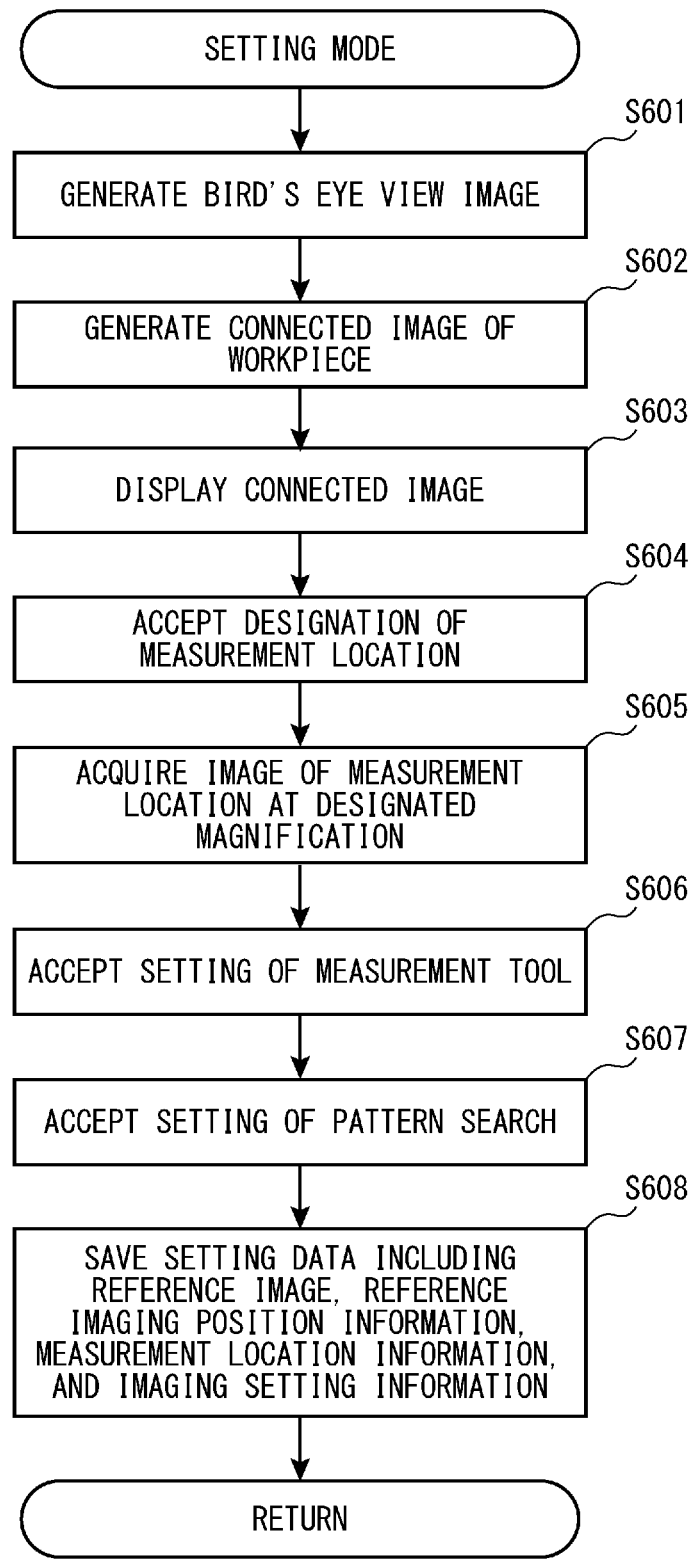
FIG. 6 is a flow chart showing a setting mode.

FIG. 6 is a flow chart showing the setting mode.

In S601, the controller 60 generates a bird's eye view image using the bird's eye view camera 17. The bird's eye view image may be used in the setting mode or in the measurement mode. In particular, the bird's eye view image will be useful in roughly positioning the workpiece W with respect to the movable stage 12. When the bird's eye view image is not used, S601 is omitted.

Figure 8:
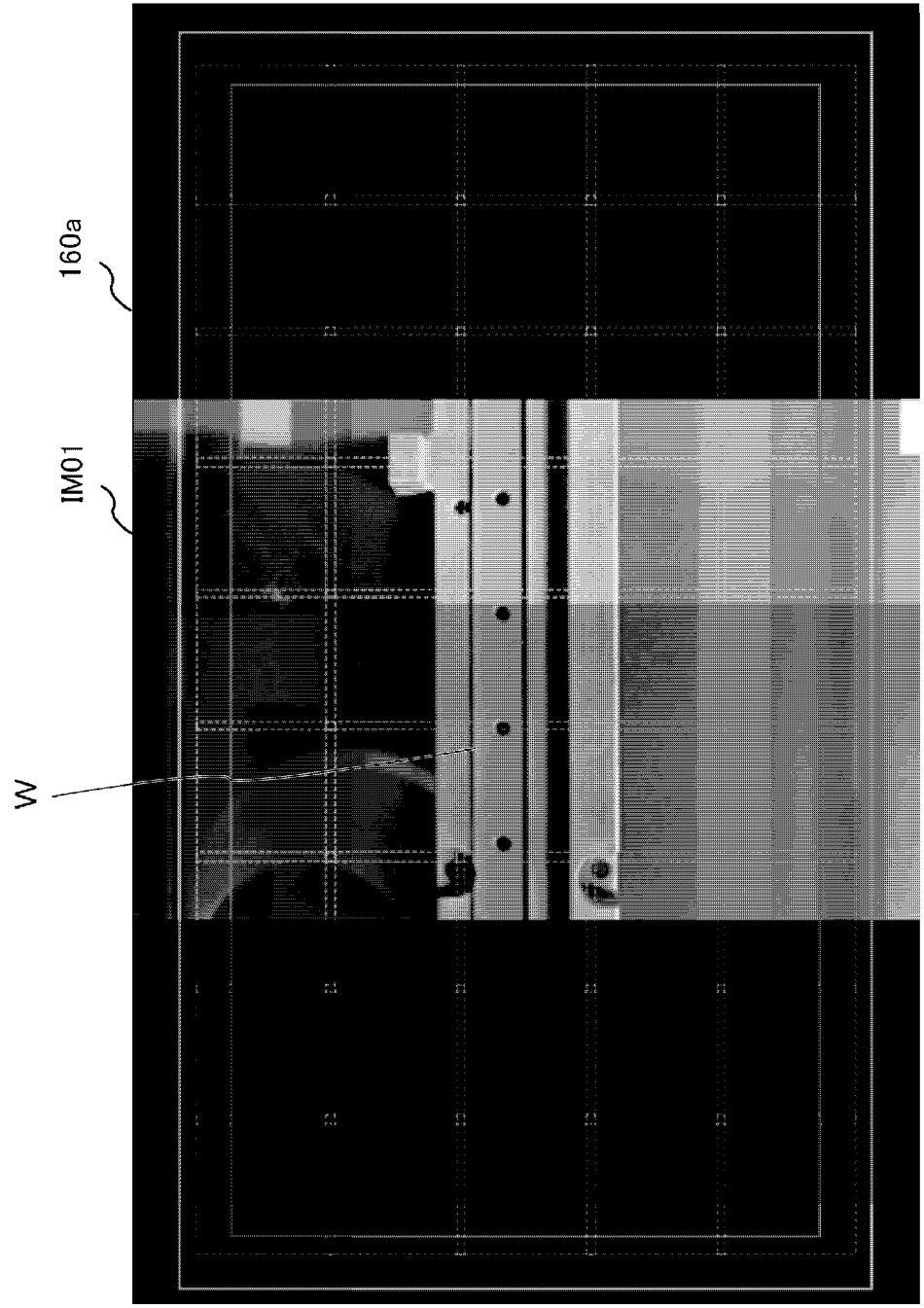
FIG. 8 is a diagram illustrating a user interface.

FIG. 8 shows a user interface 160a which displays a bird's eye view image IM01. The bird's eye view image IM01 here is generated using the bird's eye view camera 17R. The controller 60 moves the movable stage 12 such that the center of the movable stage 12 coincides with the optical axis of the bird's eye view camera 17R and causes the bird's eye view camera 17R to perform imaging, thereby generating the bird's eye view image IM01 and displaying the bird's eye view image IM01 on the display device 11. When the bird's eye view image IM01 acquired in S601 is to be used in the setting mode or the measurement mode, the bird's eye view image IM01 is held in the storing device 70.

In S602, the controller 60 (the image connecting section 64) generates a connected image of the workpiece W. In order to set a measurement location for each measurement tool with respect to the workpiece W, it is convenient for the user if there is an image representing almost the entire workpiece W. However, an enormous amount of time is required to create a connected image while scanning the entire movable stage 12 using the low-magnification camera 110 and the high-magnification camera 120. Generally, an area of the workpiece W in a planar view is smaller than an area of the movable stage 12. Therefore, the controller 60 (the workpiece determining section 63) detects the edge of the workpiece W using the low-magnification camera 110, and generates a plurality of low-magnification images while moving the movable stage 12 so as to follow the edge (outer edge) of the workpiece W. Further, the controller 60 (the image connecting section 64) generates a connected image representing almost the entire workpiece W by connecting the plurality of low-magnification images. Each low-magnification image is captured with both the epi-illumination and the transmission illumination which will be described later. That is, a low-magnification image is acquired with the epi-illumination turned on and the transmission illumination turned off, and another low-magnification image is acquired with the epi-illumination turned off and the transmission illumination turned on. A connected image is generated by connecting the plurality of low-magnification images acquired using the epi-illumination. The connected image has texture information of the surface of the workpiece W. On the other hand, another connected image is generated by connecting a plurality of low-magnification images acquired using the transmission illumination. In this another connected image, the edge of a contour portion of the workpiece W becomes clear.

Figure 9:
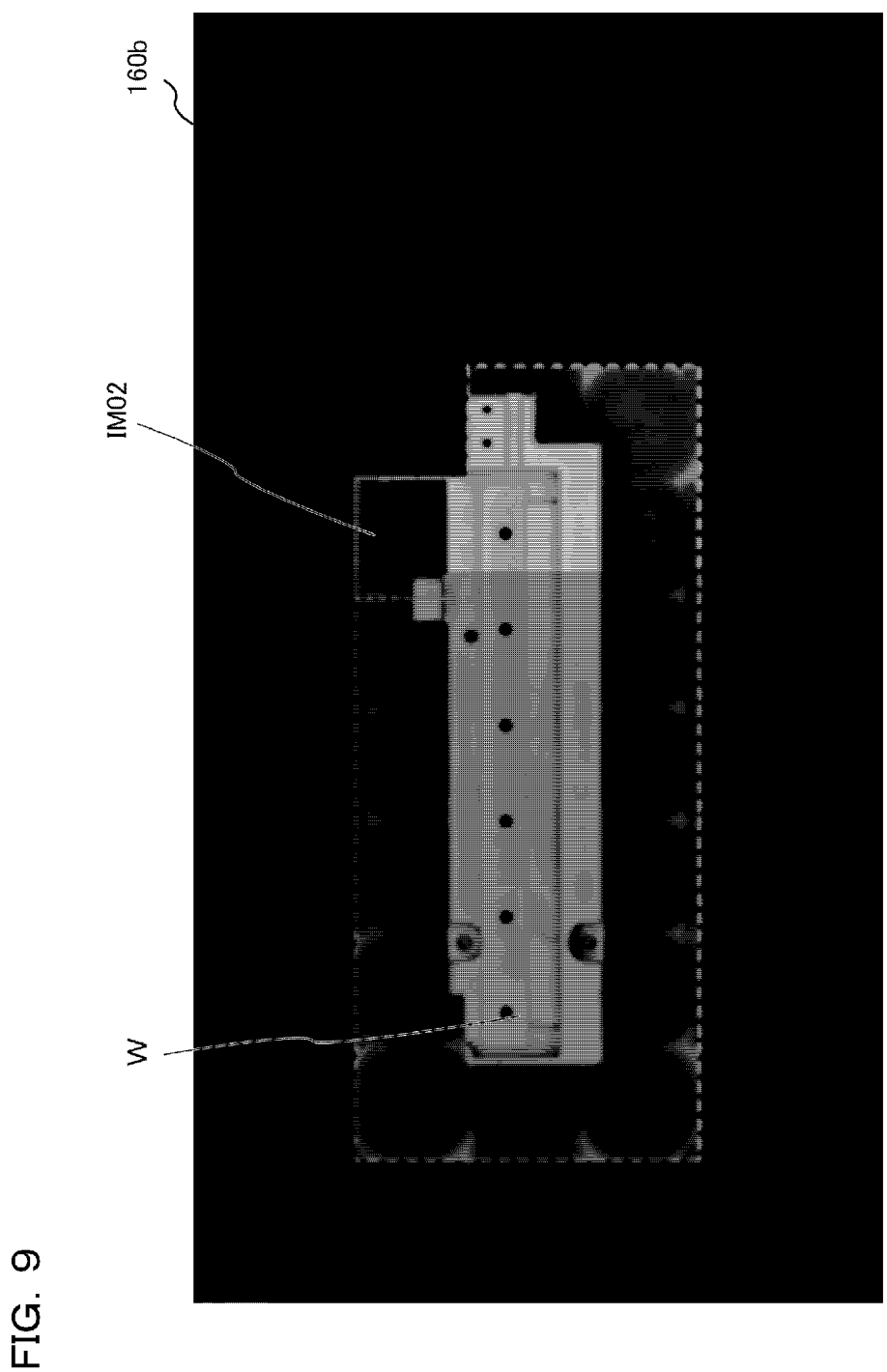
FIG. 9 is a diagram illustrating a user interface.

FIG. 9 shows a user interface 160b displayed on the display device 11 during the generation of a connected image. In particular, FIG. 9 shows an example of connecting the low-magnification images captured with the epi-illumination. The workpiece determining section 63 generates a low-magnification image IM02 while extracting an edge, and the workpiece determining section 63 or the image connecting section 64 maps the generated low-magnification image IM02 on the user interface 160b in association with an imaging position and displays the low-magnification image IM02 on the user interface 160b. In this example, 20 low-magnification images IM02 are generated.

In S603, the controller 60 (the image connecting section 64) displays a connected image of the workpiece W on the display device 11.

Figure 10:
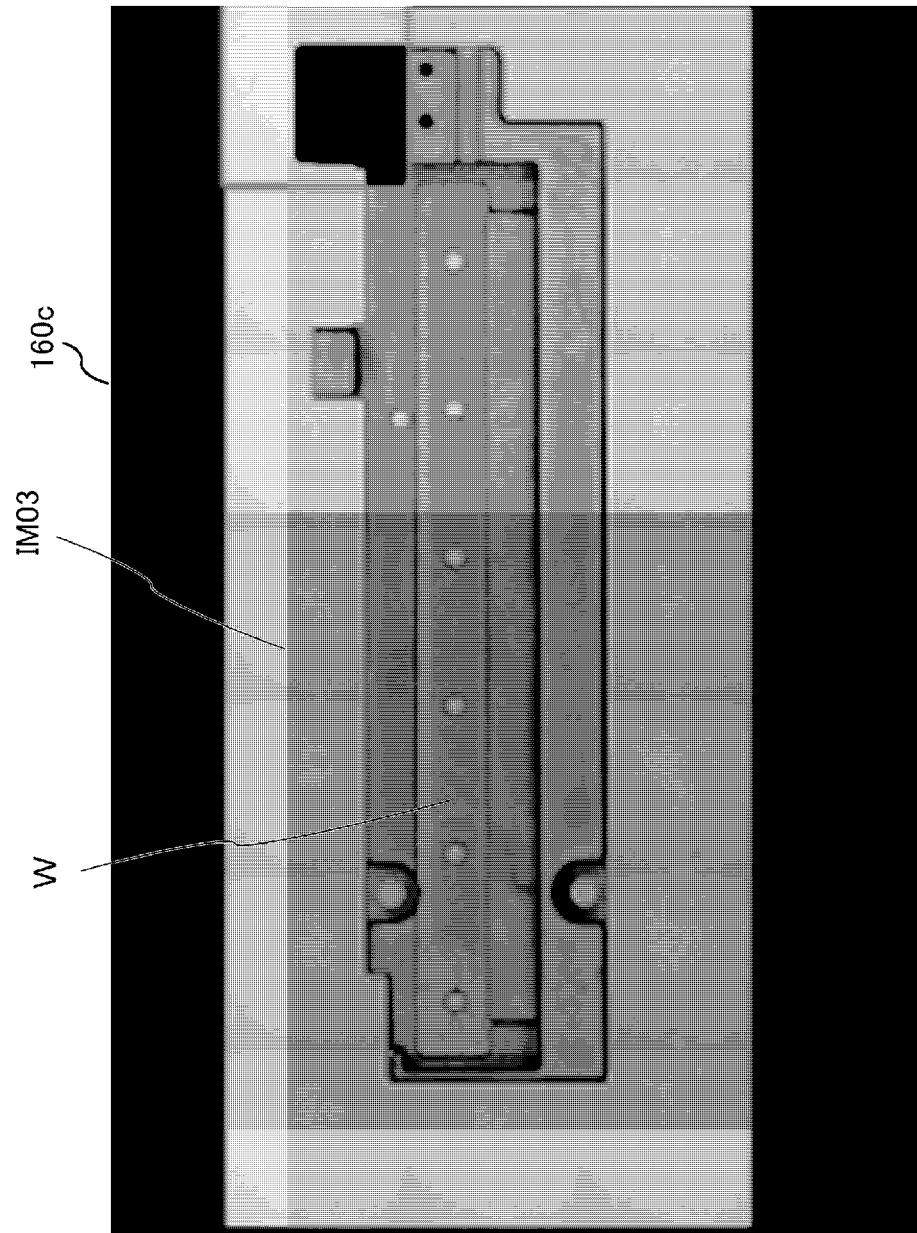
FIG. 10 is a diagram illustrating a user interface.

FIG. 10 shows a user interface 160c for displaying a completed connected image IM03. In this example, the image connecting section 64 generates the connected image IM03 by connecting 21 low-magnification images IM02 based on the imaging positions.

In S604, the controller 60 (the setting section 61) accepts a setting of a measurement location. In S605, the controller 60 (the setting section 61) acquires an image of the measurement location at a designated magnification. In S606, the controller 60 (the setting section 61) accepts a setting of a measurement tool.

The connected image generated so as to include the entire workpiece W is an image used by the user to perform measurement settings.

Figure 11:
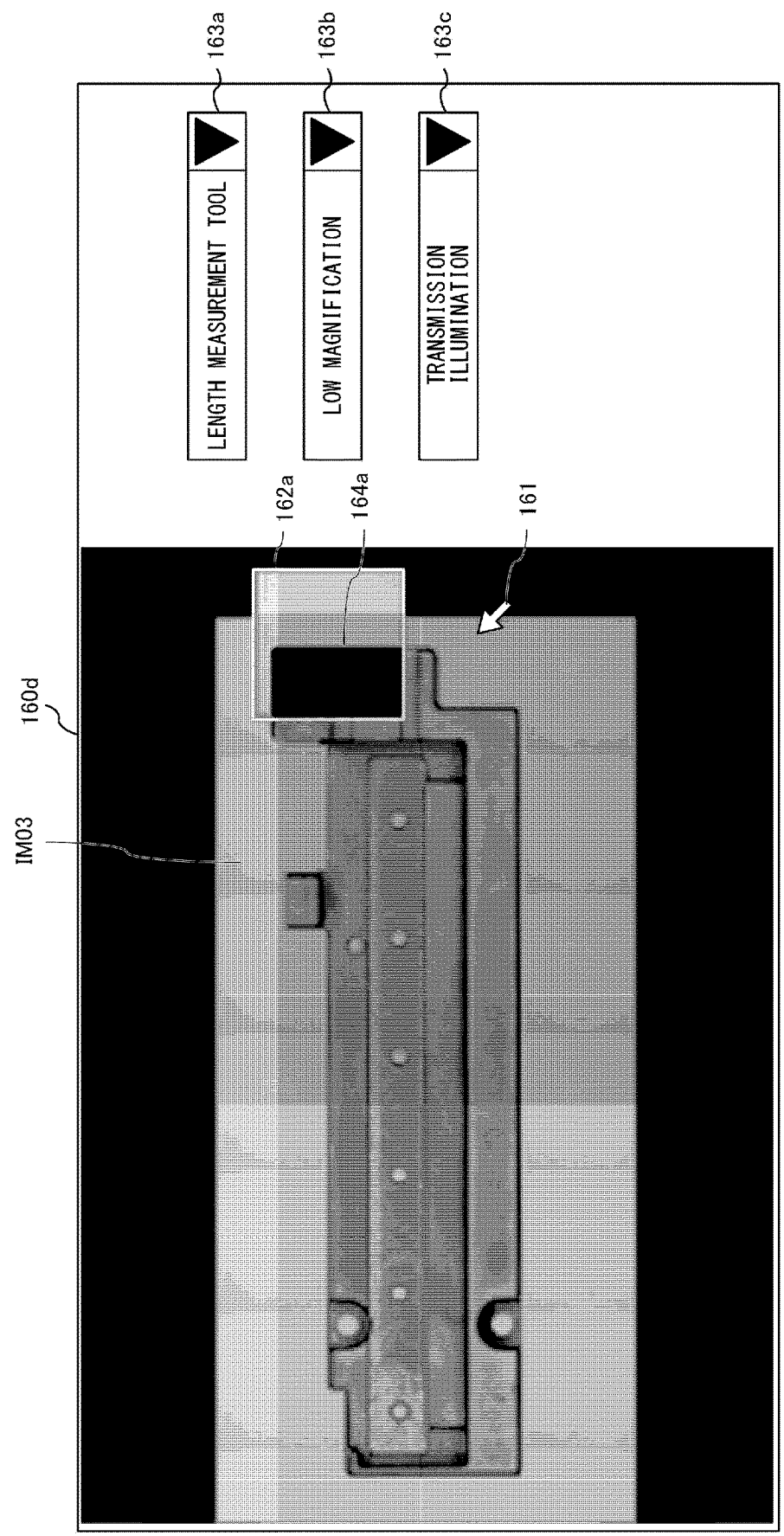
FIG. 11 is a diagram illustrating a user interface.

FIG. 11 shows a user interface 160*d* displayed on the display device 11 to accept a setting of a measurement location. The user interface 160*d* generated by the setting section 61 has a display region where the connected image IM03 is displayed. The user operates a pointer 161, selects a measurement tool from a tool selecting section 163*a*, selects an imaging magnification from a magnification selecting section 163*b*, and selects an illumination type, brightness, and the like (illumination conditions) from an illumination selecting section 163*c*. When the illumination control section 81 has a function of executing automatic adjustment of light amount, the selection of brightness may be omitted. The user designates a measurement location 162*a* by selecting an edge to be extracted in the connected image. The setting section 61 controls the imaging control section 82 and the illumination control section 81 so as to execute imaging for the measurement location 162*a* with the magnification and the illumination condition selected by the user. As the illumination condition, any one of epi-illumination, transmission illumination, and ring illumination can be selected. The ring illumination can move up and down. When the ring illumination is selected, the user can set vertical positions of the ring illumination. The illumination condition may be automatically set based on definition (contrast) of the edge selected by the user. In addition, the focal position (focus position) may be automatically adjusted based on the definition (contrast) of the edge while automatically changing the focus at the selected imaging magnification. The setting section 61 displays the image acquired with the magnification, the illumination condition, and the automatically adjusted focal position selected for the measurement location 162*a* by superimposing the image on the connected image IM03. The user visually checks whether the edge is properly extracted. In this example, since low magnification and transmission illumination are selected, the image acquired for the measurement location 162*a* is a transmission illumination image in which the edge of the outer edge of the workpiece W is emphasized. The user sets an edge 164*a* that is a reference of a distance measured by the selected measurement tool by operating the pointer 161. In this example, since a length measurement tool is selected, a length from a reference point (e.g., another edge or a center of a circle, etc.) to the edge 164*a* is measured. Although not shown in FIG. 11, the setting section 61 also accepts a setting of a measurement location that is a reference point. The setting section 61 assigns identification information to each measurement location, and creates setting data by associating the type (measurement content) of the selected measurement tool and the position of the measurement location, etc.

Figure 12:
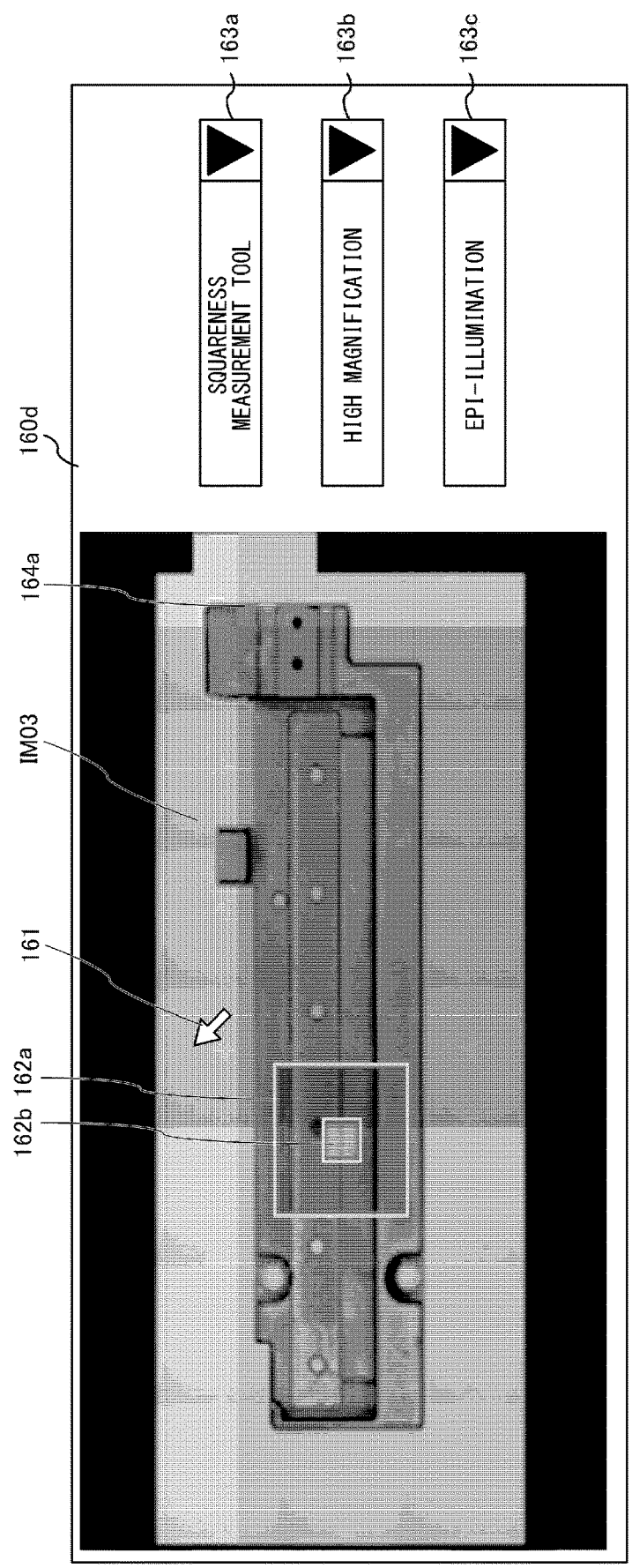
FIG. 12 is a diagram illustrating a user interface.

FIG. 12 shows a user interface 160*d* displayed on the display device 11 for accepting the setting of the measurement location. In this example, the user operates the pointer 161 to select the measurement location 162*a*. The user selects a squareness measurement tool from the tool selecting section 163*a*, selects a high magnification from the magnification selecting section 163*b*, and selects epi-illumination from the illumination selecting section 163*c*. The squareness measurement tool is a tool that measures a squareness of two edges. The setting section 61 changes the measurement location 162*a* corresponding to the low magnification to the measurement location 162*b* corresponding to the high magnification, causes the coaxial epi-illumination 130 to perform illumination through the illumination control section 81, moves the movable stage 12 to the measurement location 162*b* through the imaging control section 82, and causes the high-magnification camera 120 to perform imaging. The setting section 61 displays a high-magnification image on the measurement location 162*b*.

Figure 13:
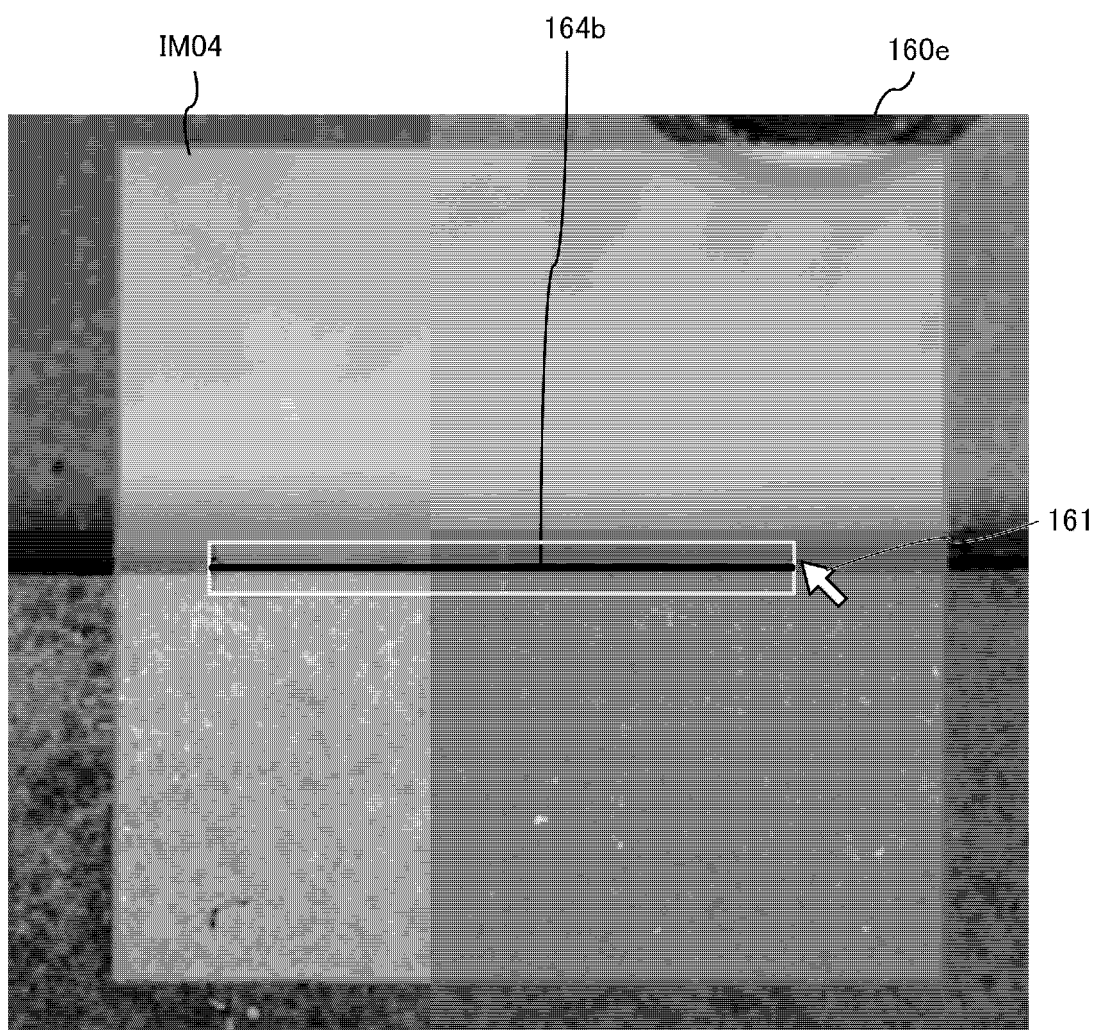
FIG. 13 is a diagram illustrating a user interface.

FIG. 13 shows a user interface 160*e* for executing a magnified display of the measurement location 162*b*. When the setting section 61 detects that the measurement location 162*b* is clicked by the pointer 161, the setting section 61 displays the user interface 160*e*. For a high-magnification image IM04 corresponding to the measurement location 162*b*, the user operates the pointer 161 to set an edge 164*b* to be measured. Although not shown in FIG. 13, the setting section 61 sets an edge 164*a* (FIG. 11) to be measured according to a user instruction. Therefore, in this example, a squareness of the edge 164*a* shown in FIG. 12 and the edge 164*b* shown in FIG. 13 is measured. The setting section 61 assigns identification information to each measurement location, and associates the type (measurement content) of the selected measurement tool and the position of the measurement location, etc. The measurement location may include a plurality of edge extraction locations, or may be composed of one edge extraction location. Examples of the measurement location composed of one edge extraction location include a measurement location for measuring a diameter of a hole, a measurement location for measuring roundness of the hole, etc.

In S607, the controller 60 (the setting section 61) accepts pattern search setting.

Figure 14:
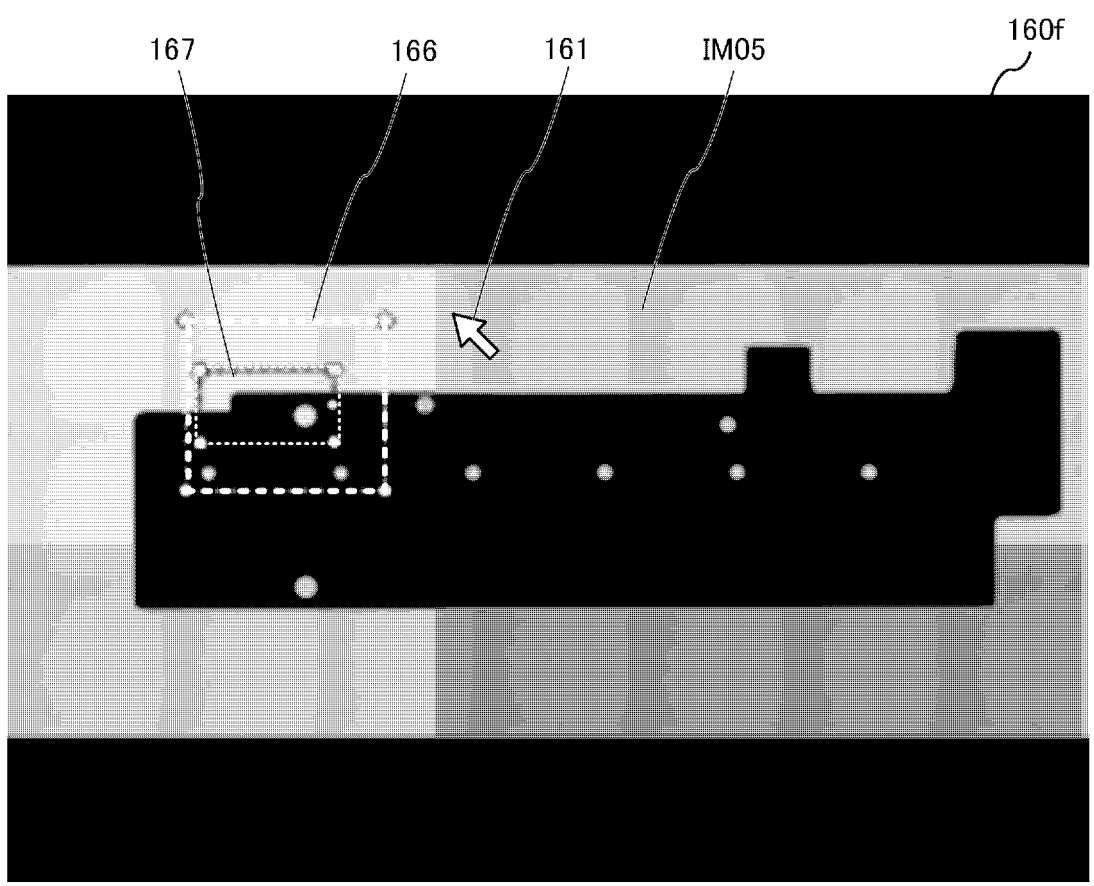
FIG. 14 is a diagram illustrating a user interface.

FIG. 14 shows a user interface 160*f* which accepts pattern search setting. The workpiece determining section 63 generates a transmission illumination image together with an epi-illumination image when creating the connected image IM03, and generates a connected image IM05 by connecting a plurality of transmission illumination images. The user interface 160*f* has a display region of the connected image IM05. The setting section 61 accepts settings of a search region 166 in which a pattern search is executed and a registration region 167 of a reference image. The search region 166 may be referred to as an imaging range. The setting section 61 saves coordinates of the search region 166 and coordinates of the registration region 167 designated by the user in the connected image IM05 into the setting data 71. The setting section 61 extracts an image included in the registration region 167 as a reference image. The reference image includes a feature relating to the shape of the workpiece W used in the pattern search. The setting section 61 obtains position information indicating a relative relation of the coordinate of each measurement location to the coordinate of the reference image, and saves the position information as measurement location information in an RAM or the like of the storing device 70. The measurement location information is used to determine the measurement location in a workpiece image acquired for each workpiece in the measurement mode. The setting section 61 converts the coordinate of the search region 166 in the connected image IM05 into a machine coordinate, and saves the machine coordinate as a part of reference imaging position information in an RAM or the like of the storing device 70.

In S608, the controller 60 (the setting section 61) saves the reference image, the reference imaging position information, the measurement location information, and imaging setting information, etc. in the setting data 71, and stores the setting data 71 in the storing device 70.

(Description of Association of the Measurement Location and Each Imaging Condition Using a Workpiece of a Use Case)

FIG. 23A is a diagram showing a planar view of the workpiece W for explaining an example of setting data stored in the storing device. FIG. 23B is a diagram showing a side view of the workpiece W corresponding to the setting data. FIG. 23C shows the magnification, illumination conditions, and focal position at each measurement location in the setting data. A measurement location 2301a is a hole that does not penetrate. An edge of the measurement location 2301a cannot be extracted with the transmission illumination, and thus epi-illumination is set. When the measurement location 2301a is small, edge extraction cannot be performed with sufficient resolution at a low magnification. Therefore, the magnification is set to a high magnification. A focus position is automatically adjusted and is set to Z1. Z1 may indicate a height (distance) with reference to a placement surface of the movable stage 12.

A measurement location 2301b is a linear edge included in the contour of the workpiece W, and thus transmission illumination is set and selected. In addition, for such a contour, an edge can be extracted with sufficient accuracy even at a low magnification, and thus the magnification is set to a low magnification. The focus position for the measurement location 2301b is automatically set to Z1 as for the measurement location 2301a.

For a measurement location 2301c, an edge can be extracted at a low magnification. However, since the edge is connected to an R plane, it is necessary to select ring illumination which irradiates slit light and to set the height (focal position Z2) of the ring illumination to an appropriate height.

As described above, the user appropriately sets the magnification, the illumination condition, and the focus position according to the characteristics of each measurement location. Further, each measurement location is associated with information indicating a relative positional relation with respect to the reference image registered in the pattern search setting. Therefore, when the pattern search succeeds, a machine coordinate (relative position information of the stage and the camera unit) for imaging each measurement location is automatically determined. FIG. 23A also shows a preset pattern search region 2300 as an example.

Measurement Mode

Figure 7:
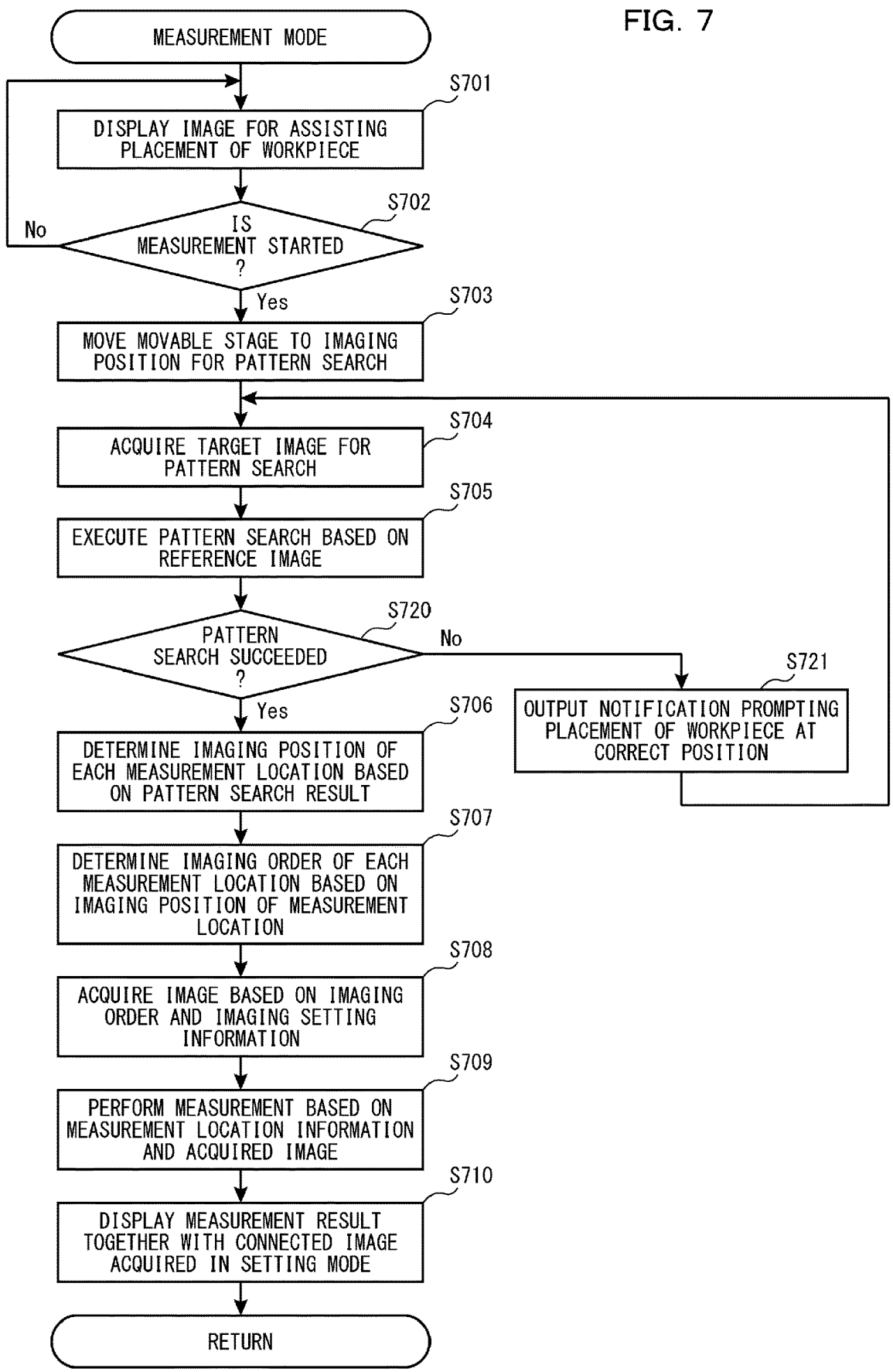
FIG. 7 is a flow chart showing a measurement mode.

FIG. 7 is a flow chart showing a continuous measurement mode.

In S701, the controller 60 (the measurement control section 62) displays an image for assisting the user in placing the workpiece W on the display device 11.

Figure 15A:
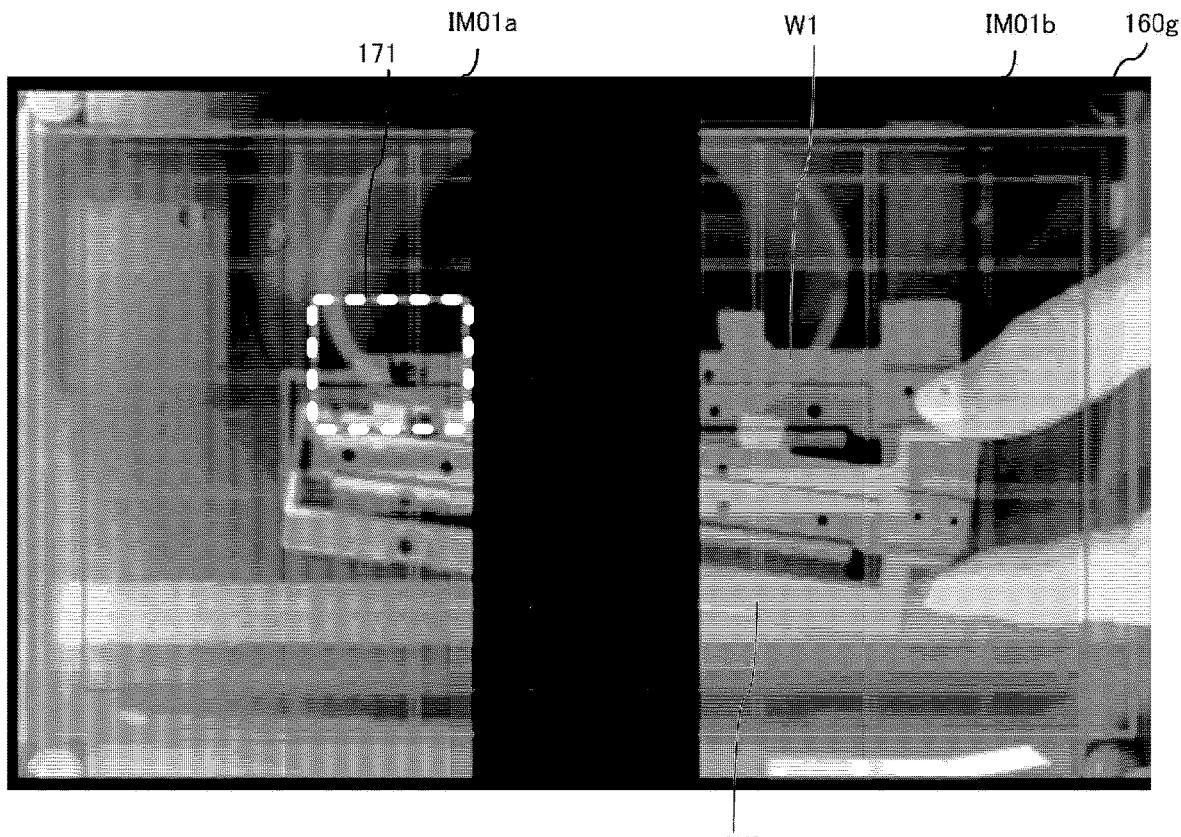
FIGS. 15A and 15B are diagrams illustrating a user interface.
Figure 16:
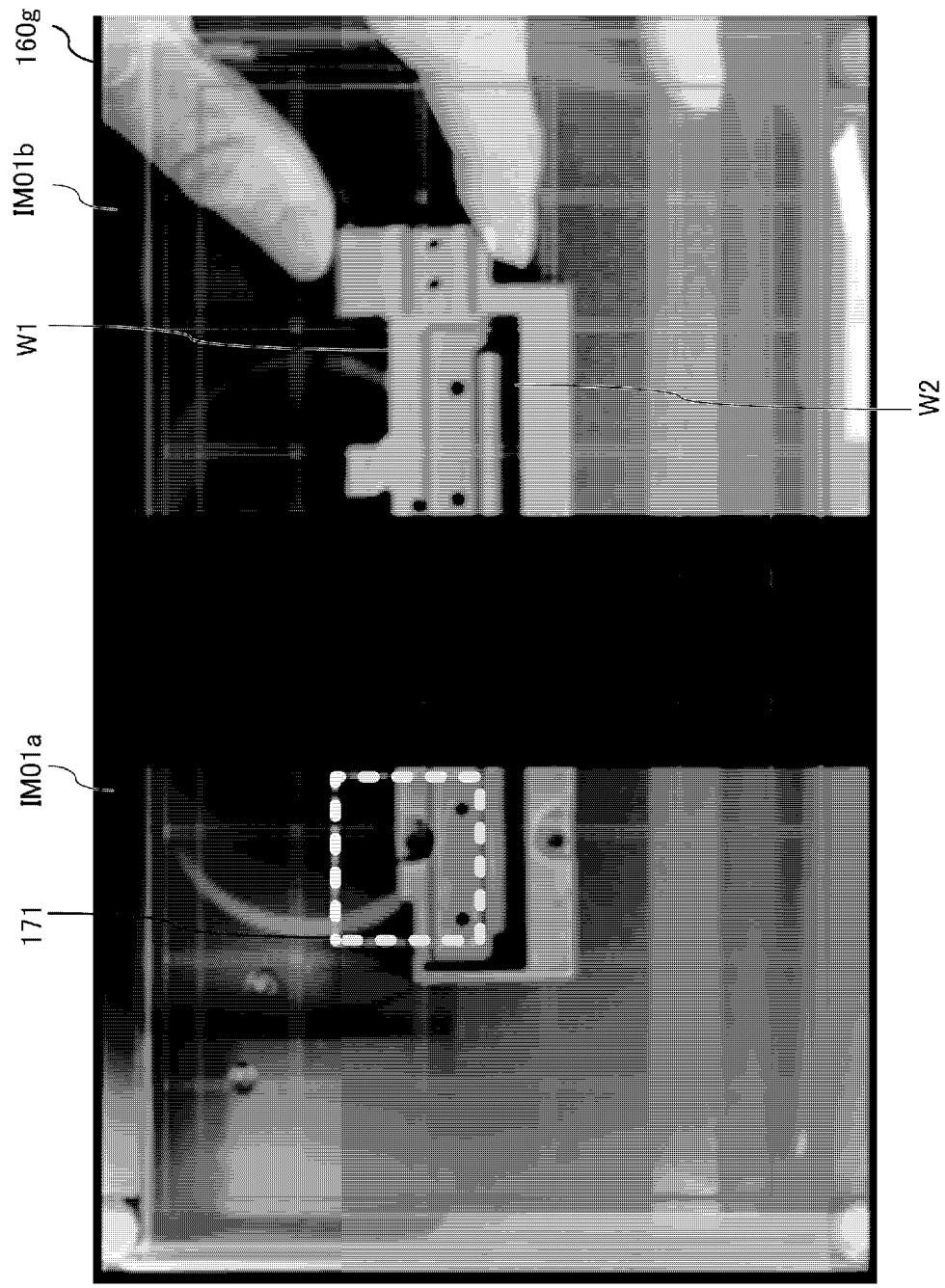
FIG. 16 is a diagram illustrating a user interface.

FIG. 15A and FIG. 16 show a user interface 160g including guidance information for assisting or guiding the user to place the workpiece W. In the user interface 160g, bird's eye view images IM01a and IM01b acquired in the setting mode are superimposed and displayed together with bird's eye view images IM01a and IM01b that are live images. In this example, workpiece W1 indicates a workpiece image acquired in the setting mode, and workpiece W2 is a current live image. That is, when the user moves the workpiece W, the workpiece W2 displayed on the user interface 160g also moves. An alignment frame 171 is a frame corresponding to the search region 166. The alignment frame 171 is fixed with respect to the bird's eye view images IM01a and IM01b acquired in the setting mode. The user positions the workpiece W1 on the movable stage 12 such that a feature portion of the workpiece W2 is contained within the alignment frame 171 or the workpiece W2 overlaps the workpiece W1. The measurement control section 62 may assist positioning of the workpiece W2 by displaying the bird's eye view images IM01a and IM01b acquired in the setting mode in a translucent manner. As described above, the image of the alignment frame 171 and the workpiece W1 is an example of guidance information for assisting or guiding the user to place the workpiece W.

In S702, the controller 60 (the measurement control section 62) determines whether a measurement start is instructed. For example, when the execution button 16 is pressed, the measurement control section 62 determines that a measurement start is instructed. The controller 60 returns to S701 when the measurement start is not instructed. When the measurement start is instructed, the controller 60 proceeds to S703.

In S703, the controller 60 (the search section 66) moves the movable stage 12 to an imaging position for pattern search based on the setting data 71 (reference imaging position information). In general, a low-magnification image is generated in a predetermined sequence from an upper left corner of the movable stage 12 or the center of the movable stage 12, and a low-magnification image that matches the reference image is searched. Therefore, a long time is required for the pattern search. On the other hand, in the invention, the imaging position (the machine coordinate) of the search region 166 is saved in the setting data 71 in advance, and thus the search section 66 can immediately move the movable stage 12 to the imaging position of the search region 166. That is, imaging processing for searching the search region 166 and repeated movement of the movable stage 12 are not required. When the user who performed the setting and the user to perform measurement are the same, the user remembers a predetermined position where a non-defective workpiece has been placed on the movable stage 12 in the setting mode. Therefore, the user can position each workpiece to be measured at the predetermined position based on the user's memory. On the other hand, generally, the user who performed the setting and the user to perform measurement are not the same. In this case, it will be difficult for the user performing measurement to position each workpiece at the predetermined position. Therefore, the measurement control section 62 may display the alignment frame 171 corresponding to the search region 166 on the display device 11. In this way, the user can easily reproduce the arrangement of the workpiece W in the setting mode. In other words, there is a high probability that a feature for positioning extracted from the reference image exists in the imaging position (machine coordinate) of the search region 166 determined in the setting mode. As a result, the pattern search will be completed in a short time.

Moreover, the bird's eye view image acquired in the setting mode and the current bird's eye view image may be simultaneously displayed in a translucent manner. As a result, it is possible to guide the user to place the workpiece W such that the pattern search succeeds. When the two translucent images are superimposed, a position posture of the workpiece W in the setting mode and a current position posture of the workpiece W become the same, and thus the feature portion of the workpiece is automatically included in the search region.

In the present embodiment, the guidance information for assisting or guiding the placement of the workpiece W includes the aforementioned alignment frame 171 and a translucent display of the bird's eye view image.

(Supplementary Description on the Very First Search)

Figure 15B:
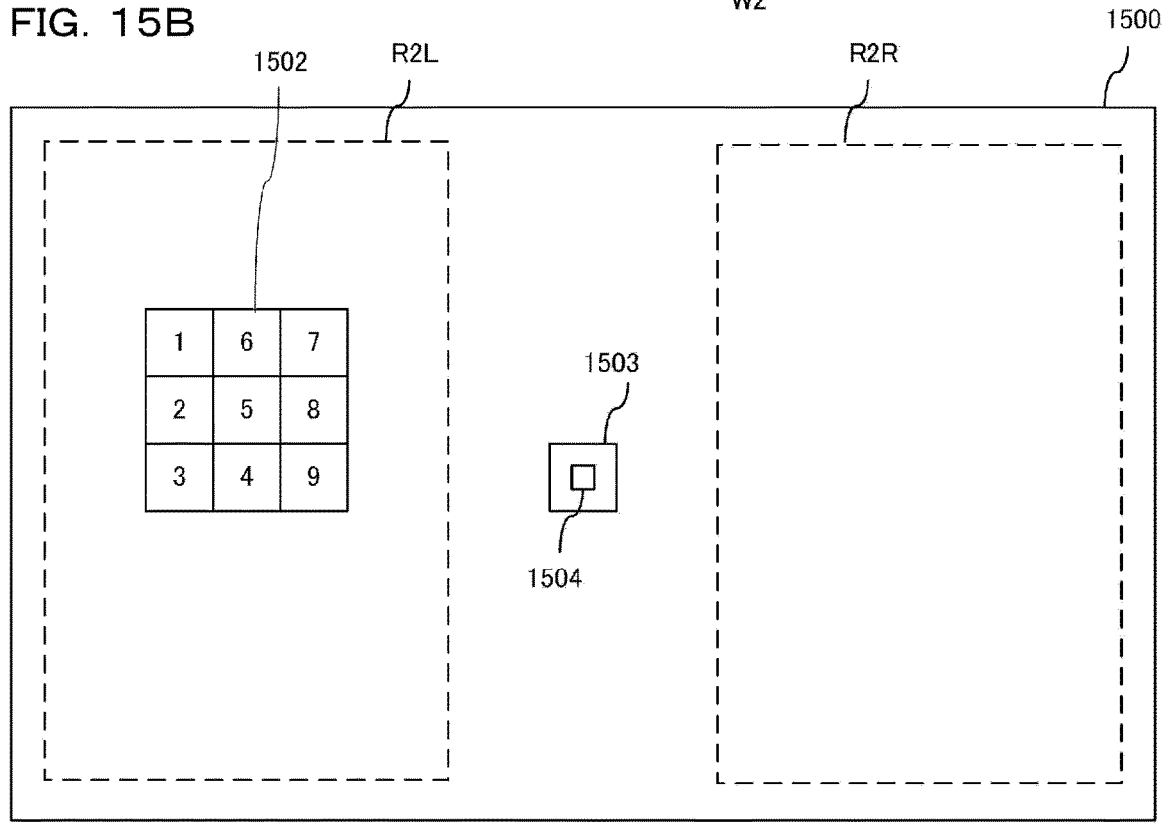

FIG. 15B is a diagram showing a relative position of a search region 1502 set by the user with respect to an entire stage movable range 1500. Reference numeral 1503 denotes the visual field range of the low-magnification camera 110. Reference numeral 1504 denotes the visual field range of the high-magnification camera 120. The search region 1502 is a region configured by connecting nine low-magnification images. Numbers given to the nine low-magnification images indicate an imaging order. When the search region 1502 is set large, the pattern search is robust against the position deviation of the workpiece W. However, the number of images to be taken increases. When the search region 1502 is set small, the pattern search will not succeed unless the position posture is substantially the same as the position posture of the workpiece W set in the setting mode. However, the number of images to be taken decreases.

Once the pattern search succeeds, a preset measurement location can be specified. Therefore, each measurement location is imaged in order with a preset magnification, illumination condition, and focus position, and the measurement can be completed in a short time.

In the above embodiment, an example in which one search region 1502 is set is shown. However, two or more search regions 1502 may be set. In this way, for example, the pattern search succeeds even when the workpiece W is rotated 180 degrees with respect to a reference posture.

In S704, the controller 60 (the search section 66) acquires a target image for pattern search. The search section 66 acquires the target image using the low-magnification camera 110 according to the setting data 71.

Figure 17:
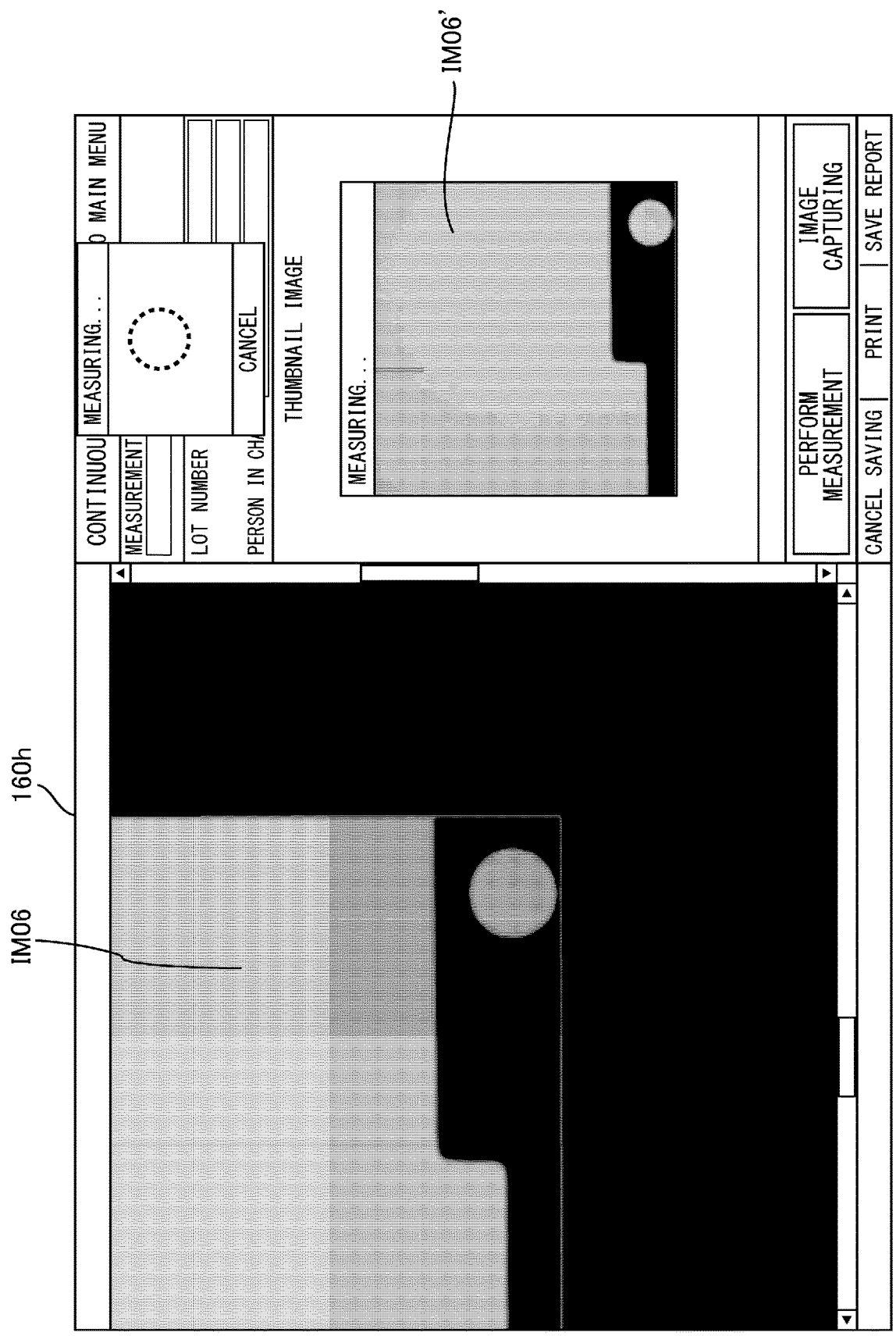
FIG. 17 is a diagram illustrating a user interface.

FIG. 17 shows a user interface 160h displayed during execution of the pattern search. The user interface 160h generated by the search section 66 or the measurement control section 62 displays a low-magnification image IM06 acquired as a target image using the low-magnification camera 110. A thumbnail image IM06' is a thumbnail image of the reference image acquired in the setting mode. The user can confirm that the pattern search is correctly executed by comparing these images.

In S705, the controller 60 (the search section 66) executes a pattern search on the target image using the reference image included in the setting data 71. The search section 66 obtains a deviation amount of the position in the X direction, a deviation amount of the position in the Y direction, and a posture (a rotation angle in the XY plane) of the workpiece W2 to be measured with respect to the reference image. S720 and S721 may be inserted between S705 and S706.

In S720, the controller 60 (the search section 66) determines whether the pattern search succeeded based on the result of the pattern search. If the pattern search succeeds, the controller 60 proceeds to S706. If the pattern search fails, the controller 60 proceeds to S721.

In S721, the controller 60 displays on the display device 11 a notification (screen) prompting the user to place the workpiece W in a correct position posture. Then, the controller returns to S704. Alternatively, the controller 60 may transition to an automatic search mode for automatically searching for the workpiece W. The controller 60 repeats imaging while regularly moving the movable stage 12 until the workpiece W enters the visual field. When the workpiece W is captured within the visual field, the controller 60 repeats imaging while moving the movable stage 12 along the contour of the workpiece W, and generates a connected image of the workpiece W by connecting the acquired plurality of images. The controller 60 specifies a measurement location by executing a pattern search on the connected image of the workpiece W.

In S706, the controller 60 (the measurement control section 62) determines an imaging position of each measurement location based on the measurement location information of the setting data 71 and the pattern search result. Since the position of a non-defective workpiece in the setting mode and the position of each workpiece in the measurement mode often do not match, it is necessary to adjust the imaging position of each measurement location for each workpiece. The measurement control section 62 performs position correction on the coordinates of each measurement location included in the measurement location information according to the pattern search result (position and posture for each workpiece), and further changes the coordinates which have gone through the position correction into machine coordinates (imaging position).

In S707, the controller 60 (the measurement control section 62) determines a measurement order of each measurement location based on the imaging position (machine coordinate) of each measurement location. As described above, the measurement control section 62 determines the measurement order of each measurement location so as to obtain the shortest route.

In S708, the controller 60 (the measurement control section 62) acquires an image by controlling the movable stage 12 and the camera unit based on the determined measurement order and imaging setting information. When the imaging setting information designates a high magnification, the high-magnification camera 120 images the workpiece W. When the imaging setting information designates a low magnification, the low-magnification camera 110 images the workpiece W. Further, the measurement control section 62 turns on any one of the coaxial epi-illumination 130, the transmission illumination 150, and the ring illumination 180 according to the set illumination condition.

That is, the controller 60 controls the movable stage 12 such that the machine coordinates of each measurement location specified based on the pattern search result can be imaged. The high-magnification camera 120 and the low-magnification camera 110 have a bifurcation optical system using a half mirror, and can acquire a high-magnification image and a low-magnification image at the same time. Therefore, an image with a magnification associated with each measurement location is acquired at a high speed by simply moving the movable stage 12. In order to acquire a plurality of images with different magnifications, an image measuring apparatus using a revolver or a zoom lens may be adopted. In this case, it takes time to change the magnification by the revolver or the zoom lens. However, since the bifurcation optical system is used, it is possible to acquire a high-magnification image and a low-magnification image at the same time, and the time required for imaging will be shortened.

Figure 18:
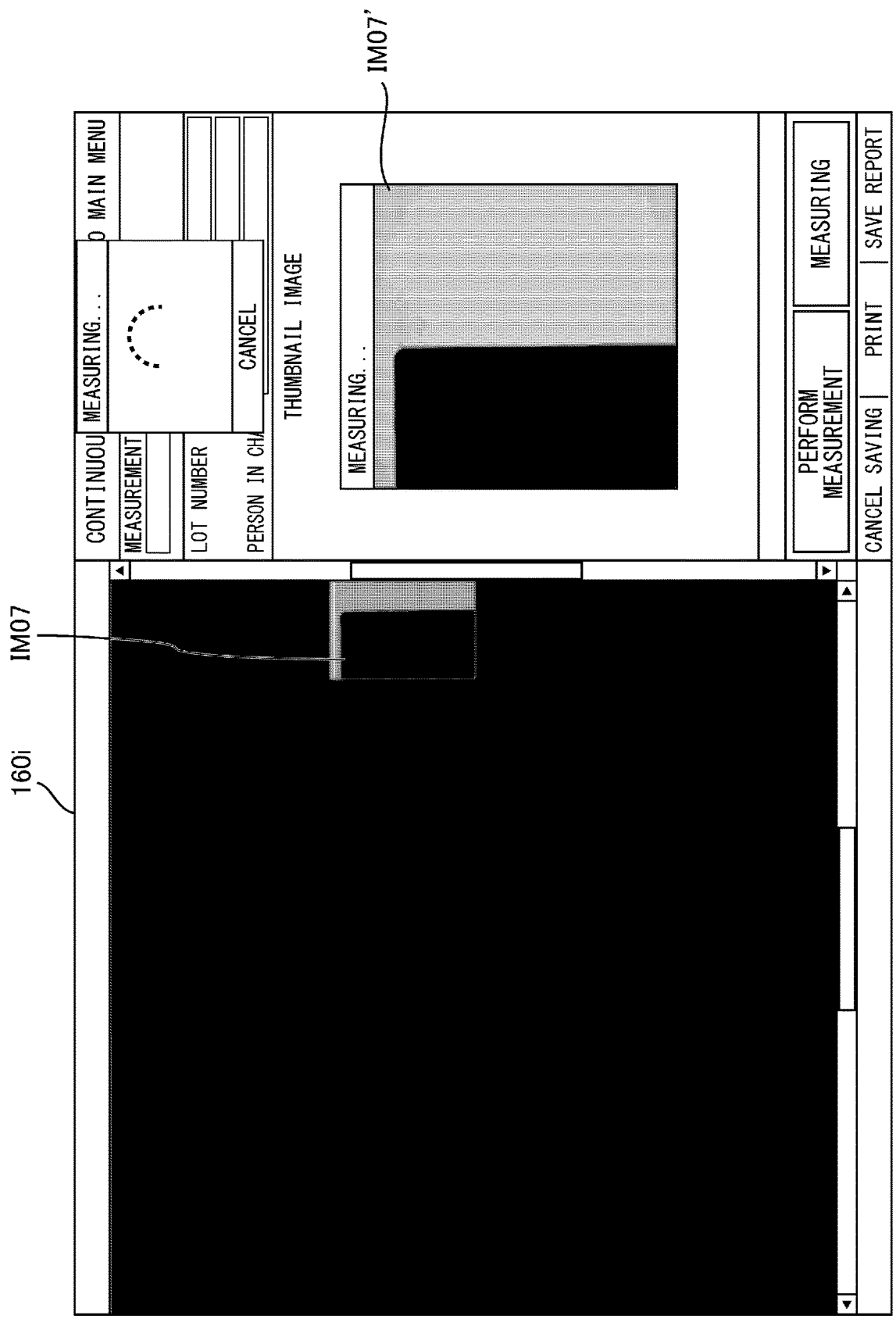
FIG. 18 is a diagram illustrating a user interface.
Figure 19:
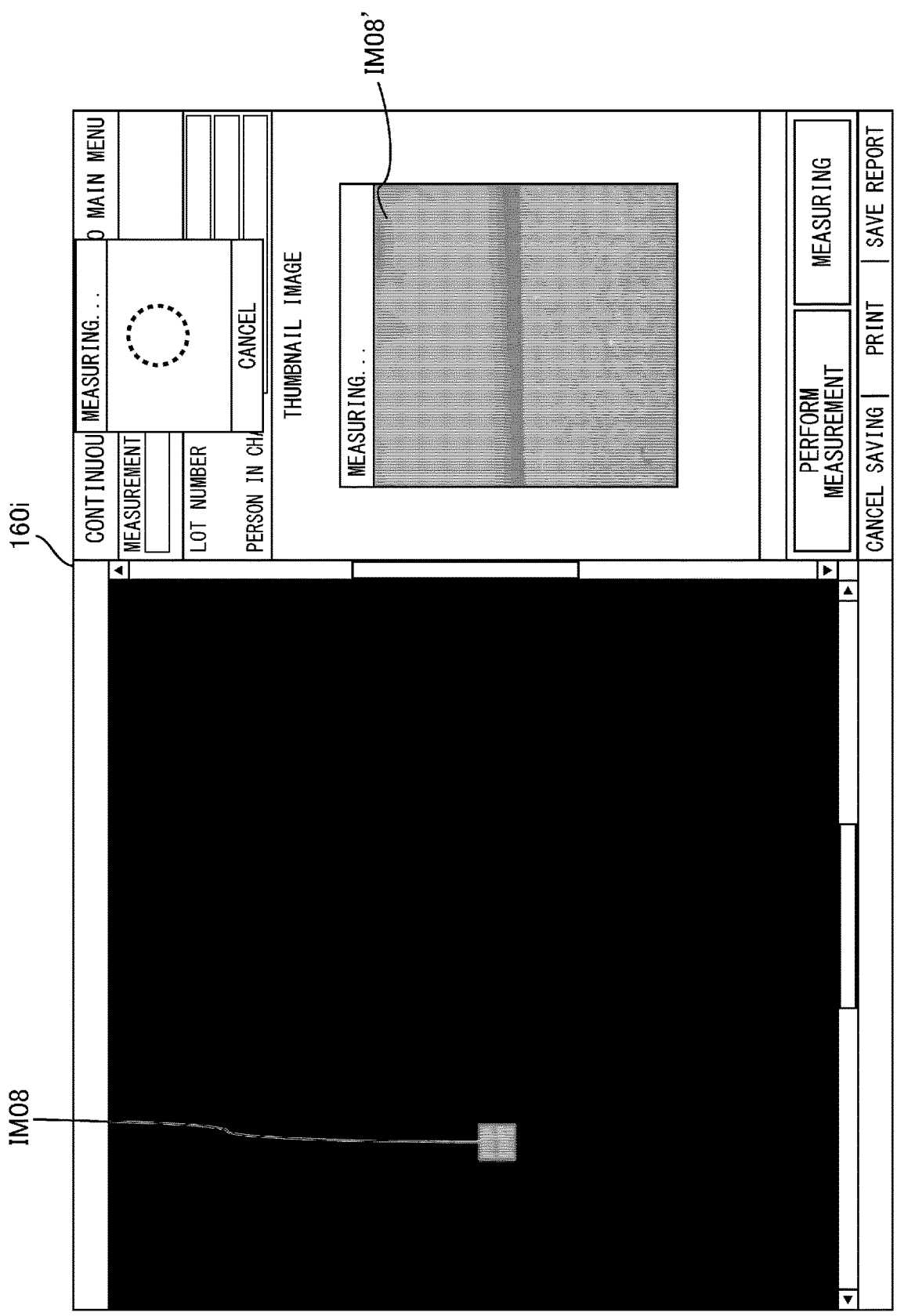
FIG. 19 is a diagram illustrating a user interface.

FIG. 18 and FIG. 19 show a user interface 160i displayed during imaging processing. In FIG. 18, the measurement control section 62 may display on the user interface 160i a display region in which an image IM07 of a measurement location acquired at each measurement location is displayed, and a display region in which a magnified image IM07' of the image IM07 is displayed. In this example, the image IM07 is a low-magnification image. In FIG. 19, the measurement control section 62 may display on the user interface 160i a display region in which an image IM08 of a measurement location acquired at each measurement location is displayed, and a display region in which a magnified image IM08' of the image IM08 is displayed. In this example, the image IM08 is a high-magnification image. The user can confirm that an image is accurately acquired at each measurement location by referring to the user interface 160*i*.

The magnified images IM07' and IM08' may be thumbnail images of the measurement locations acquired in the setting mode. The user can easily confirm that the images are acquired at correct measurement locations by comparing the images IM07 and IM08 with the thumbnail images.

In S709, the controller 60 (the measuring section 67) performs dimension measurement for each measurement location based on the images IM07, IM08 and the measurement location information, and stores measurement results in the storing device 70. For example, the measuring section 67 uses a measurement tool according to the measurement location information to extract an edge from each predetermined location and measure a distance, diameter, squareness, roundness, etc. with the edge as a reference. The measurement location information may include a threshold value such as a tolerance serving as a reference for pass/fail determination (OK/NG determination).

In S710, the controller 60 (the measuring section 67) displays the measurement result on the display device 11 together with the connected image (or the bird's eye view image) acquired in the setting mode.

Figure 20:
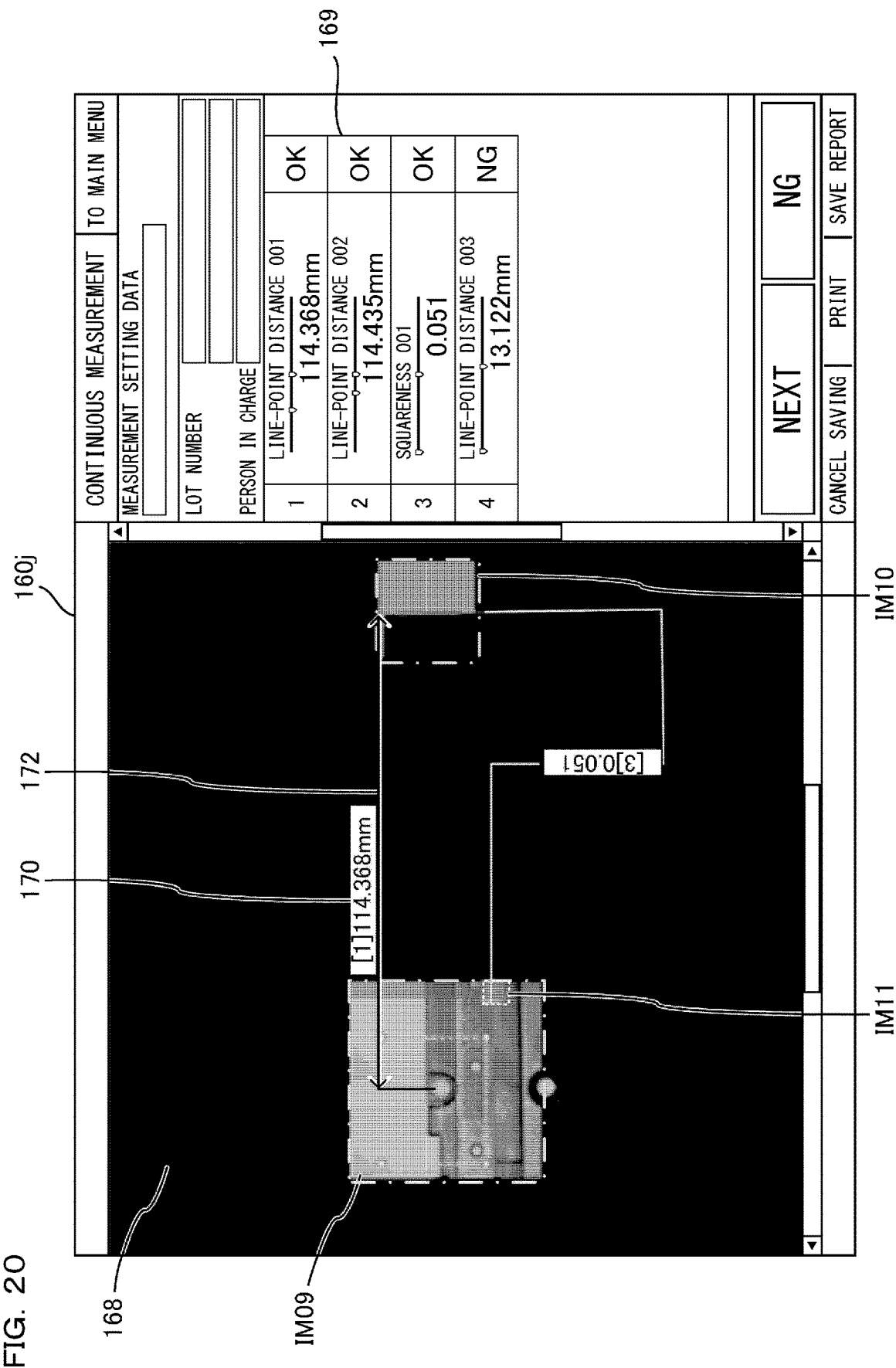
FIG. 20 is a diagram illustrating a user interface.
Figure 21:
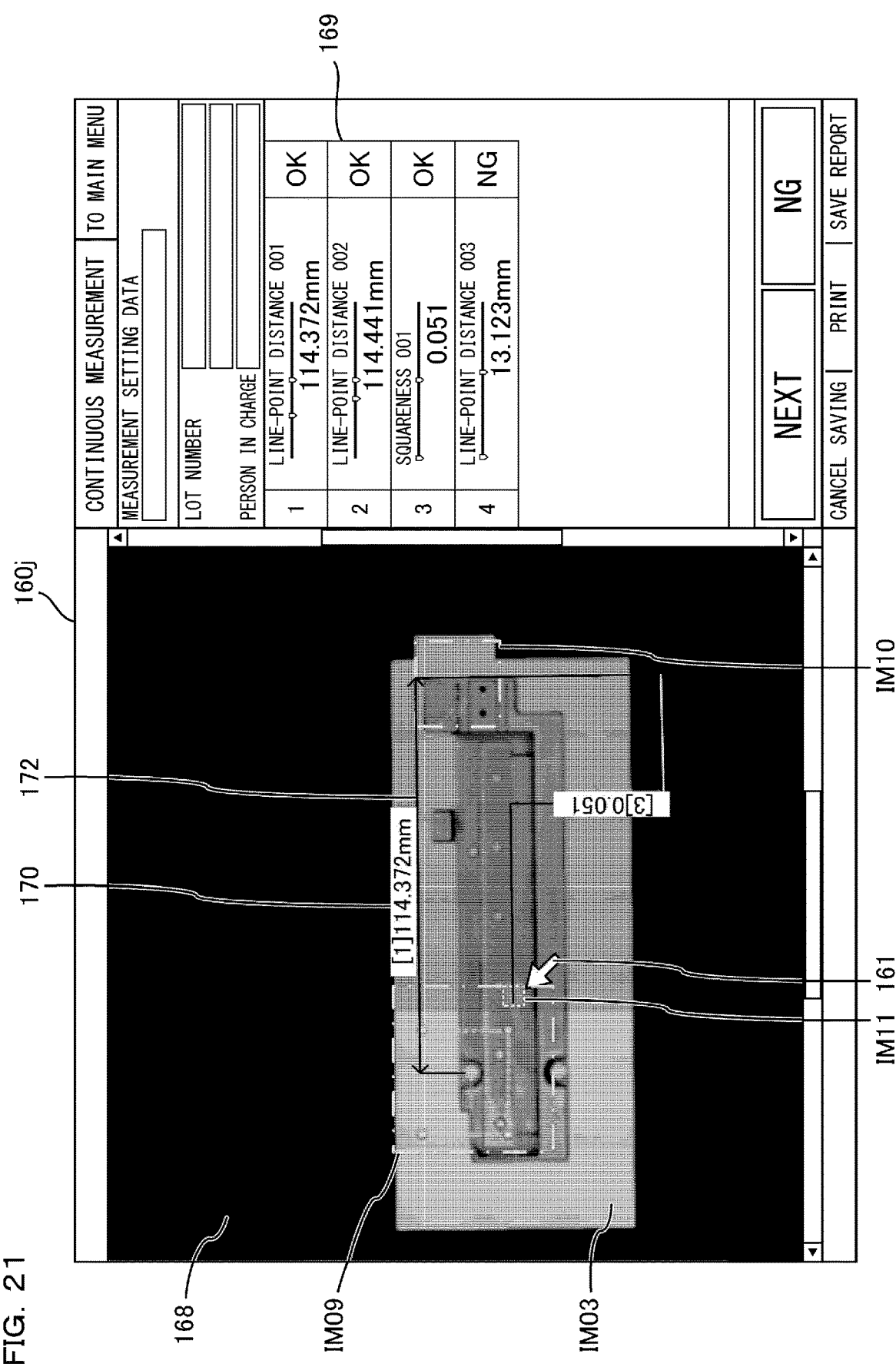
FIG. 21 is a diagram illustrating a user interface.
Figure 22:
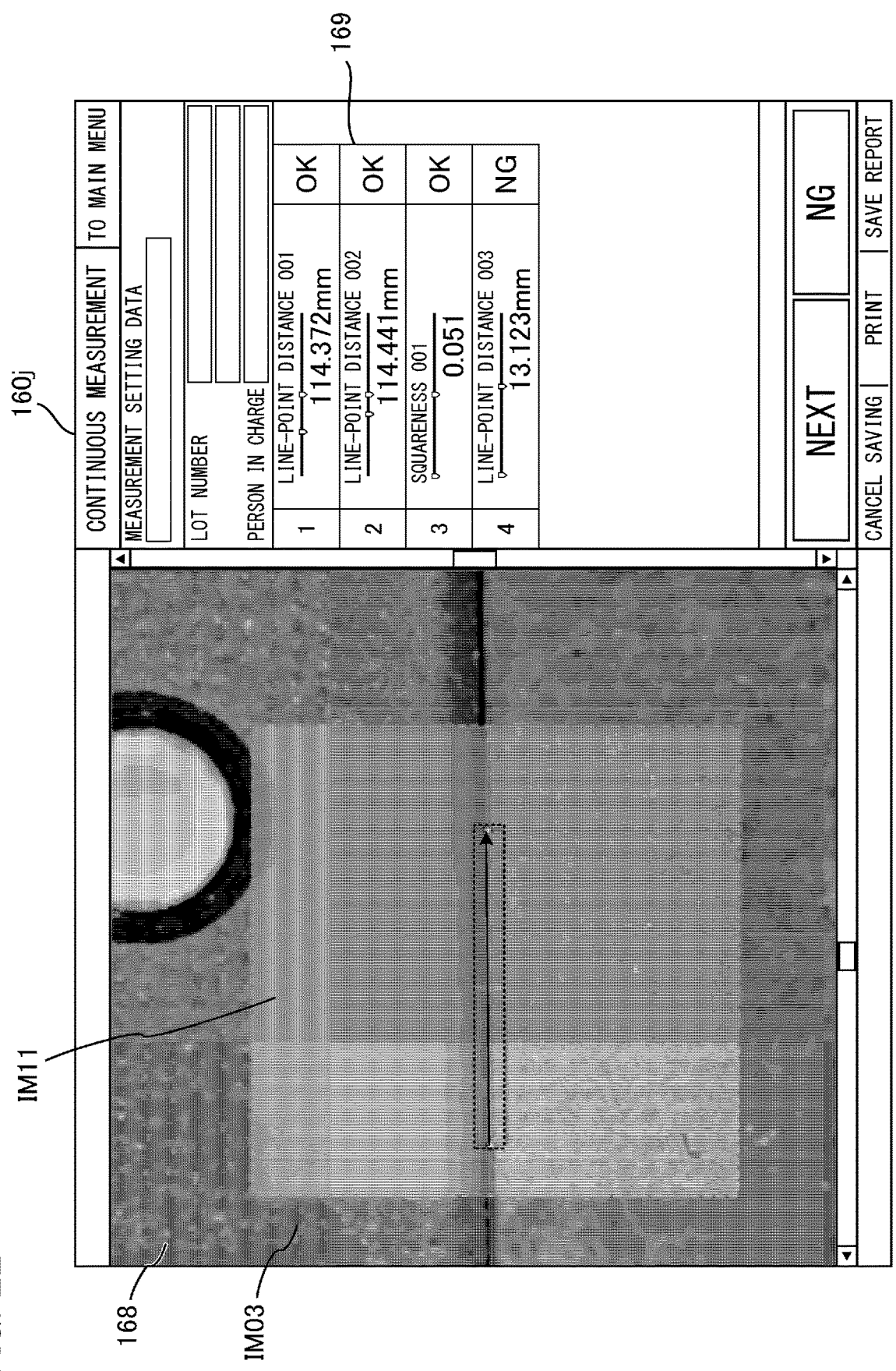
FIG. 22 is a diagram illustrating a user interface.

FIG. 20 to FIG. 22 show a user interface 160*j* for displaying the measurement result. The user interface 160*j* in FIG. 20 has an image display region 168 and a result display region 169. The image display region 168 is a region where the workpiece images IM09 to IM11 acquired in S708 are displayed. The workpiece images IM09 and IM10 are low-magnification images. The workpiece image IM11 is a high-magnification image. As described above, in the invention, images are acquired only at positions necessary for the measurement in the movable stage 12, and thus the measurement time is shortened. The measuring section 67 may display numeral information 170 indicating the measurement result and content information 172 indicating the measurement content together with the low-magnification image and the high-magnification image. The content information 172 may include, for example, information indicating a start point and an end point of a measured distance. Further, the content information 172 may include a bidirectional arrow indicating a distance. Moreover, the content information 172 may include a unit (e.g., millimeter, etc.) indicating a measurement result. The result display region 169 displays identification information of a measurement location (e.g., 1, 2, . . . ), a measurement content (e.g., a line-line distance), a measurement result (e.g., 114.368 mm), and a pass/fail determination result (e.g., OK/NG), etc.

As shown in FIG. 20, the controller 60 can measure the dimension between an edge extracted from the high-magnification image and an edge extracted from the low-magnification image. This is because there is a calibration which corrects the position of the high-magnification camera 120 and the position of the low-magnification camera 110.

A correction member to which an optical mark serving as a reference for position correction is given may be provided on a rear surface of the light transmitting plate 13 provided on the movable stage 12. The controller 60 images the optical mark with both the high-magnification camera 120 and the low-magnification camera 110, and corrects the position of the high-magnification camera 120 and the position of the low-magnification camera 110. A method for position correction is not limited hereto. For example, the high-magnification camera 120 and the low-magnification camera 110 image an adjustment jig such as a calibration chart placed on the movable stage 12. The controller 60 may correct the position of the high-magnification camera 120 and the position of the low-magnification camera 110 based on a deviation amount of the position of the position correction mark in the two images.

In the invention, an image is acquired only at a position necessary for imaging a measurement location. Therefore, the position of the image acquired during measurement becomes a discrete position with respect to the connected image of the workpiece W acquired in the setting mode. An image is acquired in the measurement mode only for a part of the connected image acquired in the setting mode. Assuming that only the image acquired in the measurement mode is displayed on the display device 11 without acquiring the connected image acquired in the setting mode, the display screen of the measurement result would be as shown in FIG. 20. That is, a plurality of images are arranged discretely, and it is difficult for the user to understand the measurement result of which position in the entire workpiece W is displayed. Therefore, in the embodiment, as shown in FIG. 21, in the image display region 168, the workpiece images IM09 to IM11 acquired in the measurement mode are superimposed and displayed on the connected image IM03 acquired in the setting mode.

In the setting mode, the connected image 42 is stored in the storing device 70 together with the setting data 71. The connected image 42 is displayed on the user interface in the setting mode, and is displayed on the display device 11 when accepting various measurement settings. Further, the connected image 42 is read from the storing device 70 even in the measurement mode, and is displayed with the measurement result superimposed on the connected image. This makes it easier for the user to visually check at which position in the entire workpiece W the measurement result has been acquired. Here, examples of the measurement result include a pass/fail determination result, a measurement value, a symbol indicating a position where the measurement has been performed, etc. When a symbol is displayed, the measurement value may be displayed in a display region different from the display region in which the connected image 42 is displayed.

The position information of each measurement location is determined based on relative coordinate position information with respect to the reference image for pattern search. Therefore, when the pattern search succeeds, the display position of the measurement result can be determined.

Further, in the invention, in the measurement mode, a low-magnification image or a high-magnification image acquired at each measurement location is displayed superimposed on the connected image. In this way, in the connected image, only the measurement location is displayed being replaced by or superimposed on an image actually acquired in the measurement mode. Therefore, when a desired measurement result cannot be obtained, the user can check the actual image acquired in the measurement mode. As a result, the user will be able to visually understand the reason why the desired measurement result was not obtained.

Figure 24:
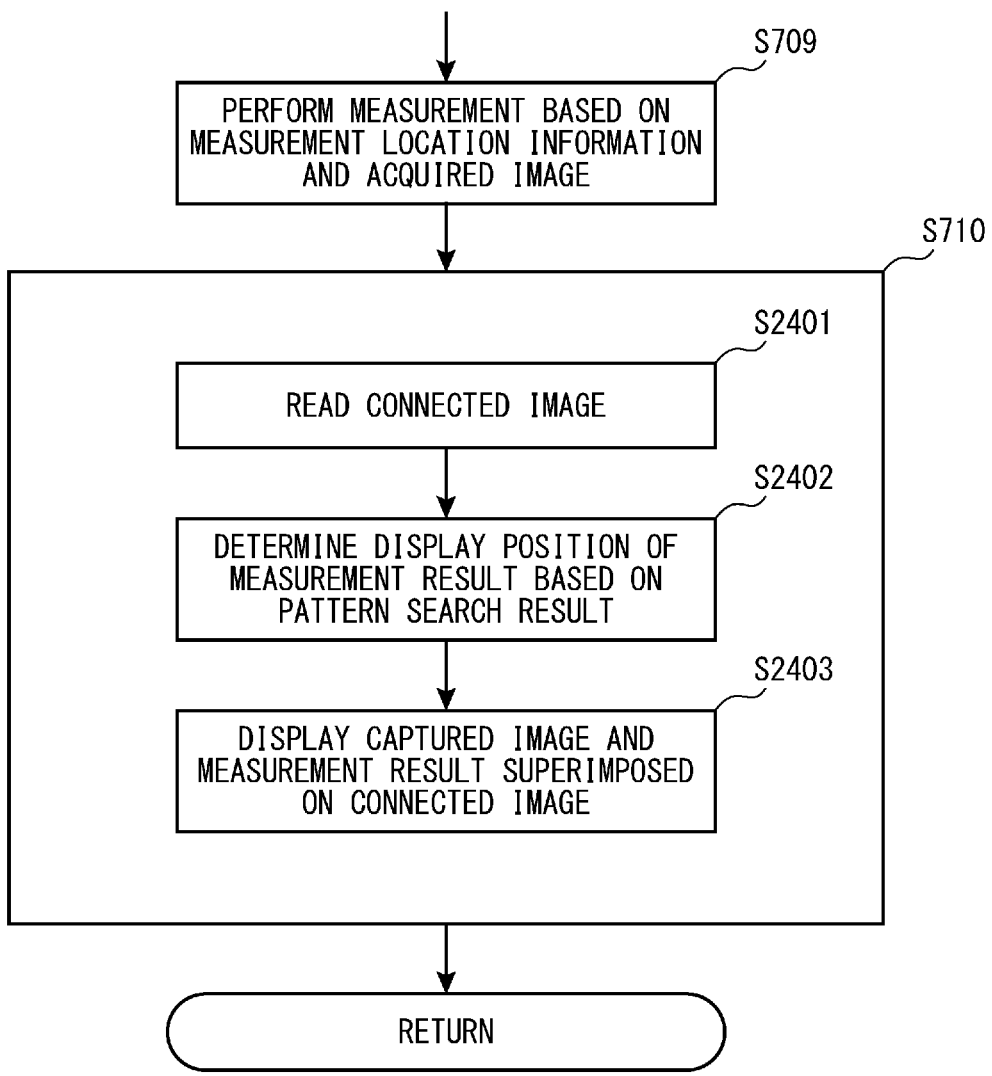
FIG. 24 is a flow chart illustrating a detailed example of S710.

FIG. 24 is a detailed flow chart of S710. In S709, the controller 60 performs measurement based on the measurement location information and the acquired image, and then proceeds to S2401. In S2401, the controller 60 reads the connected image 42 which is stored in the storing device 70 and as acquired in advance in the setting mode. In S2402, the controller 60 determines a display position of the measurement result based on the pattern search result obtained in S705. In S2403, the controller 60 displays the captured image and the measurement result obtained in the measurement mode by superimposing the captured image and the measurement result on the connected image 42 obtained in advance in the setting mode (e.g., FIG. 21).

Note that the connected image IM03 acquired in the setting mode may be displayed while the workpiece images IM09 to IM11 acquired in the measurement mode may not be displayed in the image displaying region 168.

As shown in FIG. 22, the measuring section 67 may magnify and display the workpiece image IM11 of the measurement location designated by the user. When a specific measurement location is clicked by the pointer 161, the measuring section 67 displays the workpiece image IM11 corresponding to the clicked measurement location in the image display region 168. This will make it easier for the user to confirm that a correct edge is being measured.

SUMMARY

The movable stage 12 is an example of a table on which a workpiece is placed. The camera unit 85 is an example of an imaging section including a low-magnification optical system that images the workpiece at a low magnification to generate a low-magnification image, and a high-magnification optical system that has an optical axis which is coaxial with an optical axis of the low-magnification optical system and that images the workpiece at a magnification higher than the low magnification to generate a high-magnification image. The stage driving section 101XY is an example of a driving section that changes an imaging position of the imaging section by driving at least one of the table and the imaging section such that the table and the imaging section relatively move in an XY direction. The controller 60 functions as a processor that controls the driving section and the imaging section, generates a plurality of low-magnification images or high-magnification images for different portions of the workpiece, and generates a connected image by connecting the generated plurality of low-magnification images or high-magnification images. The storing device 70 functions as a memory that stores the connected image. As described in connection with FIG. 6, etc., in the setting mode, the processor may store in the memory a reference image for pattern search which is at least a part of the connected image, or a reference image for pattern search generated by imaging by the imaging section a position designated by a user in the connected image. Here, since the reference image is only necessary to be an image imaged by the imaging section, the reference image may be cut out from the connected image, or may be captured again after the connected image is acquired. The processor may store measurement location information indicating a plurality of measurement locations designated by the user in the connected image in the memory. For example, the measurement location information may include information indicating a relative position of a measurement location with respect to the reference image (reference imaging position) in the connected image. The imaging position information is determined in the measurement mode from the relative position of the measurement location included in the measurement location information and the pattern search result. That is, the processor may store in the memory the imaging position information indicating an imaging position of the imaging section for imaging each of the plurality of measurement locations by the imaging section. For example, the imaging position may be expressed by a machine coordinate system of the movable stage 12. In the setting mode, the processor may store in the memory the imaging setting information indicating at which magnification of the low magnification and the high magnification each imaging position is imaged. As described in connection with FIG. 7, etc., in the measurement mode, the processor controls the imaging section, acquires a target image for pattern search, and executes a pattern search on the target image for pattern search using the reference image for pattern search stored in the memory. The processor specifies a plurality of imaging positions for imaging each of the plurality of measurement locations based on measurement location information associated with each of the plurality of measurement locations stored in the memory and a result of the pattern search. That is, the relative position information of each measurement location with respect to the reference imaging position is converted into absolute imaging position information. Further, the processor generates the low-magnification images or the high-magnification images by causing the driving section to drive at least one of the table and the imaging section to sequentially set an imaging position of the imaging section to each of the plurality of imaging positions and by causing the imaging section to perform imaging at a magnification according to the imaging setting information at each of the plurality of imaging positions. Depending on the setting of the measurement location, both a low-magnification image and a high-magnification image may be generated. The processor measures, for a measurement location corresponding to each imaging position, a dimension of the measurement location based on the low-magnification image or the high-magnification image acquired for each of the plurality of imaging positions. Since imaging is performed at a magnification designated for each measurement location, the number of times of imaging in the measurement mode is reduced, and image measurement can be performed efficiently. In addition, since imaging is performed at the measurement locations and it is not necessary to perform imaging over the entire workpiece, the number of times of imaging is reduced. Dimension measurement is performed each time a workpiece is placed on the movable stage 12. Therefore, the efficiency of dimension measurement is improved by reducing the number of times of imaging for each workpiece.

The transmission illumination 150 is provided below the table which has light transmissivity in at least a part of the table. The transmission illumination 150 functions as a transmission illumination section that irradiates the workpiece placed on the table with transmission illumination light. The transmission illumination light is light that travels upward from under the table. The camera unit 85 receives light which has not been blocked by the workpiece among the transmission illumination light output from the transmission illumination 150. Therefore, the contour (outer edge) of the workpiece is emphasized in the workpiece image. As a result, the transmission illumination light is advantageous for dimension measurement relating to the outer shape of the workpiece. The coaxial epi-illumination 130 and the ring illumination are provided above the table and function as an epi-illumination section that irradiates the workpiece placed on the table with epi-illumination light. For example, in S606 and the like in the setting mode, the processor may store in the memory an illumination condition indicating which of the transmission illumination section and the epi-illumination section is used for each of the plurality of measurement locations. The illumination condition may be included in the imaging setting information.

In the measurement mode, the processor turns on an illumination section according to the illumination condition stored in the memory of the transmission illumination section and the epi-illumination section for each of the plurality of measurement locations. As described above, since the illumination condition is set for every measurement location, different illumination lights are applicable for each measurement location. This will improve the accuracy of dimension measurement.

The low-magnification camera 110 is an example of a low-magnification imaging element that images the workpiece via the low-magnification optical system. The high-magnification camera 120 is an example of a high-magnification imaging element that images the workpiece via the high-magnification optical system. As shown in FIG. 2, the low-magnification optical system and the high-magnification optical system may form a dividing optical system having the same optical axis. The memory may store position correction information for correcting a relation between a position of the low-magnification image generated by the low-magnification imaging element and a position of the high-magnification image generated by the high-magnification imaging element. The processor corrects the relation between the position of the low-magnification image and the position of the high-magnification image based on the position correction information. There is an assembly error in the low-magnification camera 110 and the high-magnification camera 120, and thus there are cases where the position of the workpiece extracted from the low-magnification image and the position of the workpiece extracted from the high-magnification image do not match. In addition, an error occurs in the position relation thereof depending on the temperature of an installation environment of the measuring unit 10. Therefore, the accuracy of dimension measurement is improved by performing position correction. In particular, position correction is important in a case of measuring a distance from a feature (edge) extracted from the low-magnification image to a feature (edge) extracted from the high-magnification image.

The display device 11 is an example of a display device that displays an image of the workpiece. In the measurement mode, the processor may display the low-magnification image and the high-magnification image distinguishably from each other among images including a part of the workpiece on the display device. As shown in FIG. 20 and FIG. 21, an image is acquired for a part of the workpiece in the measurement mode. In addition, the user may wish to know that the image is acquired correctly at a magnification set for each measurement location. Therefore, it is useful to display the low-magnification image and the high-magnification image in a distinguishable manner. For example, the controller 60 may make a border of the low-magnification image different from a border of the high-magnification image. The border color of the low-magnification image may be different from the border color of the high-magnification image. The border thickness of the low-magnification image may be different from the border thickness of the high-magnification image. The border of the low-magnification image may be a solid line, and the border of the high-magnification image may be a broken line. It would be sufficient to use such display objects that can be visually distinguished.

As described in connection with FIG. 22, in the measurement mode, the processor may display an entire image including the entire workpiece on the display device, accept a designation of apart of locations in the entire image from the user, and display the low-magnification images or the high-magnification images corresponding to the part of locations on the display device. As shown in FIG. 21, etc., an area of one high-magnification image is considerably small with respect to an area of the entire workpiece. Therefore, it becomes difficult for the user to visually recognize a feature in the high-magnification image from the high-magnification image mapped to the entire image of the workpiece. Therefore, the processor may magnify and display the high-magnification image on the display device when the high-magnification image in the entire image is designated by the user. This makes it easier for the user to visually recognize a feature shown in the high-magnification image. Although description is made to a magnified display of the high-magnification image, the processor may execute a magnified display of the low-magnification image similarly.

As described in connection with S604 and the like, in the setting mode, the processor may accept a designation of a measurement location to be imaged through the low-magnification optical system in the workpiece and a designation of a measurement location to be imaged through the high-magnification optical system in the workpiece to create the imaging setting information.

As described in connection with S602 and S603, in the setting mode, the processor may generate a plurality of low-magnification images using the low-magnification optical system so as to cover the entire workpiece and connect the plurality of low-magnification images to generate a connected image (entire image) indicating the entire workpiece. As described in connection with S604 and S605, the processor may generate a high-magnification image using the high-magnification optical system for a location designated by the user in the connected image. As a result, the high-magnification image is acquired only at the location designated by the user, and thus the number of times of imaging the high-magnification image is reduced even in the setting mode. That is, the user's waiting time accompanying imaging is reduced.

As described in connection with S607, in the setting mode, the processor may create imaging position information so as to include position information indicating an imaging position of the low-magnification image and position information indicating an imaging position of the high-magnification image based on the result of the pattern search, the reference imaging position information, and the measurement location information. The position of a workpiece in the movable stage 12 differs from workpiece to workpiece. This is because the workpiece is placed manually by the user. Therefore, the imaging position of each measurement location is dynamically determined according to the position and posture of each workpiece. The position and posture of each workpiece are specified by pattern search using the reference image. In other words, the imaging position corresponding to the measurement location information is corrected according to the deviation amount of the position and the deviation amount of the posture of each workpiece with respect to the reference image (reference imaging position), and the imaging position of each measurement location is dynamically determined. This will eliminate the need for a jig for positioning the workpiece and allow the user to freely place the workpiece.

As described in connection with FIG. 6, in the setting mode, the processor may accept a setting whether to generate an epi-illumination image for the workpiece by turning off the transmission illumination section and turning on the epi-illumination section when acquiring the target image for pattern search. In the measurement mode, when it is set to generate the epi-illumination image, the processor generates the target image for pattern search by irradiating the workpiece with transmission illumination light by the transmission illumination section, and generates an epi-illumination image of the workpiece by turning off the transmission illumination section and turning on the epi-illumination section. In the measurement mode, when it is not set to generate the epi-illumination image, the processor generates the target image for pattern search by irradiating the workpiece with transmission illumination light by the transmission illumination section. In a case where the image including the outer shape of the workpiece is the reference image, the transmission illumination light is advantageous for the pattern search. The epi-illumination light is advantageous for the pattern search in a case where an image including a feature inside the outer shape of the workpiece becomes the reference image. Therefore, the user may select the illumination light according to the feature of the pattern search.

In the setting mode, the processor may generate a thumbnail image of the workpiece using the low-magnification image or the high-magnification image. For example, there are cases where different measurement settings are saved by a plurality of setting data. In such a case, when the user can visually recognize a thumbnail image symbolizing each measurement setting (setting data), the user would easily visually distinguish each measurement setting (setting data). The controller 60 may create a thumbnail image (an image generated by shrinking a low-magnification image or a high-magnification image used in the setting of a measurement location) for each setting data and save the thumbnail in the setting data. When the user selects setting data, the controller 60 may display a thumbnail image of each setting data on the display device 11. As shown in FIG. 17 to FIG. 19, the thumbnail image may be displayed in the measurement mode.

In the measurement mode, the processor may perform measurement of the workpiece using an edge extracted from the low-magnification image and an edge extracted from the high-magnification image. In general, a distance between a first edge extracted from the low-magnification image and a second edge extracted from the low-magnification image is measured, or a distance between a first edge extracted from the high-magnification image and a second edge extracted from the high-magnification image is measured. However, by making it possible to perform measurement of the workpiece using an edge extracted from the low-magnification image and an edge extracted from the high-magnification image, it will be possible to satisfy various needs of the user.

As shown in FIG. 21, in the measurement mode, the processor (the measuring section 67) may display the measurement result together with the connected image acquired in the setting mode. By using the connected image acquired in the setting mode, it is possible to display the measurement result together with the connected image while shortening processing time in the measurement mode. In other words, the processor (the measuring section 67) may read the connected image stored in the memory in the setting mode, and display the measurement result at a position corresponding to a measurement target location on the read connected image. The measurement result may be displayed superimposed on the connected image, or may be displayed in a display region different from the display region of the connected image.

As shown in FIG. 21, in the measurement mode, the processor (the measuring section 67) may replace an image region including a measurement location in a connected image with a low-magnification image or a high-magnification image corresponding to the measurement location, and display the measurement result of the measurement location together with the connected image in the display device. The image of the measurement location is surely acquired in the measurement mode. Therefore, the image of the measurement location may be displayed synthesized with or superimposed on the connected image. In other words, the display device may display the measurement result superimposed on the connected image acquired in the setting mode, or display a synthesized image generated by synthesizing the measurement result with the connected image acquired in the setting mode. The image of the measurement location is suitable for the user to visually observe a measurement error in the measurement location, an error in manufacture of the measurement location, etc. Therefore, it is desirable that the image of the measurement location is an image acquired individually from each workpiece.

The processor (the measuring section 67) may replace an image region including a measurement location in a connected image with a low-magnification image or a high-magnification image corresponding to the measurement location, and display the measurement result of the measurement location together with the connected image.

The processor (the controller 60) may save the connected image, the reference image, the reference imaging position information, the measurement location information, and the imaging setting information in a setting file (the setting data 71). Further, the processor may save a thumbnail image symbolizing measurement content specified by a setting file in the setting file. The bird's eye view cameras 17R and 17L function as bird's eye view cameras that acquire a bird's eye view image of the table. The processor may save the bird's eye view image as a thumbnail image in the setting file. Generally the entire workpiece is shown in the bird's eye view image. Therefore, the user can easily select a desired setting file from a plurality of setting files by referring to the thumbnail image of the bird's eye view image.

The UIs shown in FIG. 20 and FIG. 21 may be improved. For example, the display device (the display device 11) may display a user interface including a first display region and a second display region in the measurement mode. The first display region may display a connected image showing the entire workpiece. The second display region may display an image acquired at a measurement location or a thumbnail image. In this way, the user can confirm the measurement location while checking the entire workpiece.

As shown in FIG. 21, the display device may display information indicating the measurement location and a measurement result for each measurement location together with the connected image showing the entire workpiece.

As can be seen from FIG. 20, the number of low-magnification images or high-magnification images acquired for each measurement location in the measurement mode is smaller than the number of low-magnification images or high-magnification images acquired to form a connected image in the setting mode. Therefore, the processing time required for imaging in the measurement mode is shortened.

As described in connection with S607, the processor may store the reference imaging position information indicating the imaging position of the reference image in the memory in the setting mode. The imaging position of the reference image may be expressed as an imaging position in a machine coordinate system for managing a movement amount in the XY direction by the driving section. The processor manages a current position of the table in the machine coordinate system. For example, assume that the current position of the table is represented by (Xnow, Ynow) and the imaging position of the reference image is represented by (Xref, Yref). In this case, a movement amount ΔX in the X direction is a difference between Xnow and Xref, and a movement amount ΔY in the Y direction is a difference between Ynow and Yref. The driving section moves the table to the imaging position by rotating a motor by ΔX and rotating the motor by ΔY. As described in connection with S703, in the measurement mode, the processor moves the imaging position of the imaging section to the imaging position of the reference image by driving at least one of the table and the imaging section by the driving section according to the reference imaging position information stored in the memory. In this way, the processing time for pattern search is shortened. In particular, the closer the position of the workpiece used when acquiring the reference image is to the position of the workpiece to be measured, the shorter the time for pattern search will be.

In the measurement mode, when the pattern search succeeds, the processor (the controller 60) may specify a plurality of imaging positions for imaging each measurement location. In the measurement mode, when the pattern search fails, the processor may display on the display device information prompting to adjust the position of the workpiece on the table. As a result, the user can easily reproduce a placement position of the workpiece determined in the setting mode even in the measurement mode.

When the measurement mode is started, the processor (the controller 60) may first move the imaging position of the imaging section to the imaging position of the reference image by driving at least one of the table and the imaging section by the driving section according to the reference imaging position information stored in the memory. In this way, the pattern search can start immediately.

In the measurement mode, when the pattern search is completed, the processor (the controller 60) may specify a plurality of imaging positions for imaging each measurement location based on the measurement location information associated with each measurement location stored in the memory and the pattern search result. The processor (the controller 60) may, based on the measurement location information associated with each measurement location stored in the memory and the pattern search result, determine a display position of the measurement result for each measurement location and display the measurement result at the determined display position. The position and inclination of the workpiece in the reference image are often different from the position and inclination of the workpiece in the measurement target workpiece image. Therefore, it is specified by the pattern search to what degree the position and inclination are deviated. The display position of the measurement result is managed in association with the measurement location information. Therefore, by correcting the display position of the measurement result associated with the measurement location information according to the position and inclination of the workpiece specified by the pattern search, it becomes possible to correctly display the measurement result on the workpiece image acquired in the measurement mode.

In the setting mode, the processor (the controller 60) may store the position information of the imaging range (e.g., the search region 166) of the reference image designated by the user in the memory. As shown in FIG. 15A and FIG. 16, in the measurement mode, the processor may display on the display device guidance information for guiding the placement of the workpiece together with a live image acquired by the imaging section based on the position information of the imaging range of the reference image stored in the memory. In this way, the user can easily adjust the position of the workpiece appropriately.

As shown in FIG. 16, the guidance information may include a frame (e.g., the alignment frame 171) in which a feature portion of the workpiece included in the reference image is contained. The position of the workpiece on the table may be adjusted by the user such that the feature portion of the workpiece is contained in the frame displayed on the display device.

In the setting mode, the processor (the controller 60) may accept, with respect to the connected image, a designation of the registration region 167, which is a region for acquiring the reference image, and a designation of the search region 166, which is a region for pattern search for the reference image. The frame may coincide with the outer edge of the search region.

As shown in FIG. 16, the live image may be a bird's eye view image generated by a bird's eye view camera. As a result, the user can easily understand the position of the workpiece with respect to the movable stage 12. The bird's eye view camera may have a first camera (e.g., the bird's eye view camera 17R) and a second camera (e.g., the bird's eye view camera 17L) having different imaging ranges. The live image and the bird's eye view image may be images acquired by both or one of the first camera and the second camera.

As shown in FIG. 16, the guidance information may include the bird's eye view image (e.g., an image of the workpiece W1) generated by the bird's eye view camera in the setting mode. For example, as shown in FIG. 16, the display device may, by displaying a bird's eye view image generated by the bird's eye view camera in the setting mode in a translucent manner, display the bird's eye view image superimposed on the live image. In this way, the user can adjust the position of the workpiece W2 to be measured such that the image of the workpiece W2 to be measured overlaps the image of the workpiece W1.

The invention is not limited to the above embodiment, and various modifications and/or changes can be made within the scope of the gist of the invention.

What is claimed is:

1. An image measuring apparatus comprising:
   a table on which a workpiece is placed;
   an imaging section including a low-magnification optical system comprising a low-magnification imaging element that images the workpiece at a low magnification to generate a low-magnification image, and a high-magnification optical system that has an optical axis which is coaxial with a same optical axis of the low-magnification optical system, the high-magnification optical system comprising a high-magnification imaging element that images the workpiece at a magnification higher than the low magnification to generate a high-magnification image;
   a driving section that changes an imaging position of the imaging section by driving at least one of the table and the imaging section such that the table and the imaging section relatively move in an XY direction;
   a processor that controls the driving section and the imaging section and generates a plurality of low-magnification images and high-magnification images for different portions of the workpiece;
   an image connecting section that generates a connected image by connecting the generated at least one low-magnification image of the plurality of low-magnification images and at least one high-magnification image of the plurality of high-magnification images; and a memory that stores the connected image and position correction information for correcting a relation between a position of the low-magnification image generated by the low-magnification imaging element and a position of the high-magnification image generated by the high-magnification imaging element, wherein, before a setting mode and a measurement mode, the processor corrects a coordinate of the low-magnification image and the high-magnification image based on the position correction information, wherein, in the setting mode, the processor stores in the memory a reference image for pattern search generated by imaging by the imaging section at least a part of the connected image or a position designated by a user in the connected image, measurement location information including position information indicating a relative relation of a plurality of measurement locations designated by the user in the connected image to a coordinate of the reference image, and imaging setting information indicating at which magnification of the low magnification and the high magnification each imaging position is imaged and at which focal position each imaging position is imaged, and, in the measurement mode, the processor controls the imaging section and acquires a target image for pattern search, executes a pattern search on the target image for pattern search using the reference image for pattern search stored in the memory, specifies a plurality of imaging positions for imaging each of the plurality of measurement locations based on the measurement location information associated with both of the coordinate of the reference image for pattern search and each of the plurality of measurement locations stored in the memory, and a result of the pattern search, generates the low-magnification image and the high-magnification image by causing the driving section to drive at least one of the table and the imaging section to sequentially set an imaging position of the imaging section to each of the plurality of imaging positions and by causing the imaging section to perform imaging at the magnification and the focal position according to the imaging setting information at each of the plurality of imaging positions, and measures, for a measurement location corresponding to each imaging position, a dimension of the measurement location based on the low-magnification image and the high-magnification image acquired for each of the plurality of imaging positions and a dimension of an edge extracted from the high-magnification image and an edge extracted from the low-magnification image with the coordinate of the high-magnification image and the low-magnification image corrected by the processor.

2. The image measuring apparatus according to claim 1, further comprising:

a transmission illumination section that is provided below the table which has light transmissivity in at least a part of the table, and irradiates the workpiece placed on the table with transmission illumination light; and an epi-illumination section which is provided above the table and irradiates the workpiece placed on the table with epi-illumination light, wherein, in the setting mode, the processor stores in the memory an illumination condition indicating which of the transmission illumination section and the epi-illumination section is used for each of the plurality of measurement locations, and, in the measurement mode, the processor turns on an illumination section according to the illumination condition stored in the memory of the transmission illumination section and the epi-illumination section for each of the plurality of measurement locations.

3. The image measuring apparatus according to claim 1, further comprising, a display device that displays an image of the workpiece, wherein, in the measurement mode, the processor displays the low-magnification image and the high-magnification image distinguishably from each other among images including a part of the workpiece on the display device.

4. The image measuring apparatus according to claim 3, wherein, in the measurement mode, the processor displays an entire image including the entire workpiece on the display device, accepts a designation of a part of locations in the entire image from the user, and displays the low-magnification images or the high-magnification images corresponding to the part of locations on the display device.

5. The image measuring apparatus according to claim 1, wherein, in the setting mode, the processor accepts a designation of a measurement location to be imaged through the low-magnification optical system in the workpiece and a designation of a measurement location to be imaged through the high-magnification optical system in the workpiece to create the imaging setting information.

6. The image measuring apparatus according to claim 1, wherein, in the setting mode, the processor generates a plurality of low-magnification images using the low-magnification optical system so as to cover the entire workpiece and connects the plurality of low-magnification images to generate a connected image indicating the entire workpiece, and generates a high-magnification image using the high-magnification optical system for a location designated by the user in the connected image.

7. The image measuring apparatus according to claim 1, wherein, in the setting mode, the processor creates imaging position information so as to include position information indicating an imaging position of the low-magnification image and position information indicating an imaging position of the high-magnification image based on the result of the pattern search and the measurement location information, and controls the driving section according to the imaging position information.

8. The image measuring apparatus according to claim 2, wherein, in the setting mode, the processor accepts a setting whether to generate an epi-illumination image for the workpiece by turning off the transmission illumination section and turning on the epi-illumination section when acquiring the target image for pattern search; and in the measurement mode, when the setting is set to generate the epi-illumination image, the processor generates the target image for pattern search by irradiating the workpiece with transmission illumination light by the transmission illumination section, and generates an epi-illumination image of the workpiece by turning off the transmission illumination section and turning on the epi-illumination section, and when the setting is not set to generate the epi-illumination image, the processor generates the target image for pattern search by irradiating the workpiece with transmission illumination light by the transmission illumination section.

9. The image measuring apparatus according to claim 1, wherein, in the setting mode, the processor generates a thumbnail image of the workpiece using the low-magnification image or the high-magnification image.

10. The image measuring apparatus according to claim 1, wherein, in the measurement mode, the processor performs measurement of the workpiece using an edge extracted from the low-magnification image and an edge extracted from the high-magnification image.

11. The image measuring apparatus according to claim 1, wherein the driving section changes the imaging position of the imaging section by driving at least one of the table and the imaging section such that the table and the imaging section relatively move in a Z direction.

12. The image measuring apparatus according to claim 1, wherein
   the imaging section includes a low-magnification imaging element that images the workpiece via the low-magnification optical system, and a high-magnification imaging element that images the workpiece via the high-magnification optical system, and
   the low-magnification optical system and the high-magnification optical system form a dividing optical system having the same optical axis.

13. The image measuring apparatus according to claim 7, wherein
   in a measurement mode, the processor
      controls the driving section to change the imaging position of the imaging section based on the imaging position information, and
      controls the imaging section and acquires the target image for pattern search thereafter.

14. The image measuring apparatus according to claim 7, wherein
   the imaging position information is stored in the memory as a machine coordinate of the image measuring apparatus.

15. The image measuring apparatus according to claim 5, wherein, in the setting mode, the processor generates a plurality of low-magnification images using the low-magnification optical system so as to cover the entire workpiece and connects the plurality of low-magnification images to generate a connected image indicating the entire workpiece, and generates a high-magnification image using the high-magnification optical system for a location designated by the user in the connected image.

16. The image measuring apparatus according to claim 12, further comprising,
   a display device that displays an image of the workpiece,
      wherein, in the measurement mode, the processor displays the low-magnification image and the high-magnification image distinguishably from each other among images including a part of the workpiece on the display device.

17. The image measuring apparatus according to claim 16, wherein, in the measurement mode, the processor displays an entire image including the entire workpiece on the display device, accepts a designation of a part of locations in the entire image from the user, and displays the low-magnification images or the high-magnification images corresponding to the part of locations on the display device.

18. The image measuring apparatus according to claim 12, wherein, in the setting mode, the processor accepts a designation of a measurement location to be imaged through the low-magnification optical system in the workpiece and a designation of a measurement location to be imaged through the high-magnification optical system in the workpiece to create the imaging setting information.

19. The image measuring apparatus according to claim 12, wherein, in the setting mode, the processor generates a plurality of low-magnification images using the low-magnification optical system so as to cover the entire workpiece and connects the plurality of low-magnification images to generate a connected image indicating the entire workpiece, and generates a high-magnification image using the high-magnification optical system for a location designated by the user in the connected image.

* * * * *